(12) United States Patent
Itoh et al.

(10) Patent No.: US 7,349,475 B2
(45) Date of Patent: Mar. 25, 2008

(54) MOTION VECTOR DETECTION METHOD AND APPARATUS

(75) Inventors: Goh Itoh, Tokyo (JP); Nao Mishima, Yokohama (JP); Haruhiko Okumura, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 740 days.

(21) Appl. No.: 10/383,631

(22) Filed: Mar. 10, 2003

(65) Prior Publication Data

US 2003/0174777 A1 Sep. 18, 2003

(30) Foreign Application Priority Data

Mar. 15, 2002 (JP) ............... 2002-073207

(51) Int. Cl.
*H04B 1/66* (2006.01)
*H04N 7/12* (2006.01)
*H04N 11/02* (2006.01)

(52) U.S. Cl. ............... 375/240.16; 348/402.1

(58) Field of Classification Search .......... 375/240.15, 375/240.16; 348/402.1, 413.1, 416.1
See application file for complete search history.

(56) References Cited

U.S. PATENT DOCUMENTS

| | | | | |
|---|---|---|---|---|
| 5,822,007 | A * | 10/1998 | Knee et al. ............... | 348/416.1 |
| 6,594,313 | B1 * | 7/2003 | Hazra et al. ............ | 375/240.16 |
| 6,900,846 | B2 * | 5/2005 | Lee et al. ................. | 348/459 |

FOREIGN PATENT DOCUMENTS

| | | |
|---|---|---|
| JP | 3-29477 | 2/1991 |
| JP | 8-9340 | 1/1996 |
| JP | 2528103 | 8/1996 |
| JP | 10-304369 | 11/1998 |

OTHER PUBLICATIONS

U.S. Appl. No. 10/383,631, filed Mar. 10, 2003, Itoh et al.
U.S. Appl. No. 10/657,174, filed Sep. 9, 2003, Mishima et al.
U.S. Appl. No. 10/658,539, filed Sep. 10, 2003, Itoh et al.
U.S. Appl. No. 10/806,180, filed Mar, 23, 2004, Itoh et al.
U.S. Appl. No. 10/808,319, filed Mar. 25, 2004, Mishima et al.
U.S. Appl. No. 10/855,617, filed May 28, 2004, Mishima et al.
U.S. Appl. No. 09/885,138, filed Jun. 21, 2001, Itoh et al.

* cited by examiner

*Primary Examiner*—Thai Q. Tran
*Assistant Examiner*—Jeremiah C Huber
(74) *Attorney, Agent, or Firm*—Oblon, Spivak, McClelland, Maier & Neustadt, P.C.

(57) ABSTRACT

A motion vector detection method includes extracting a first block from the m-th picture, extracting second blocks having a large correlation with respect to the first block from a (m+n)-th picture ((m+n)>m-th), detecting first motion vectors between the first and second blocks, extracting a third block located in spatially the same position as that of the first block from a (m+i)-th picture ((m+n)>(m+i)>m-th), computing second motion vectors of (n−1)/n times the first motion vectors, extracting a fourth block corresponding to a movement position of the third block from the (m+n)-th picture according to the second motion vector, and selecting an optimum motion vector maximizing a correlation between the third and fourth blocks from the first motion vectors.

13 Claims, 16 Drawing Sheets

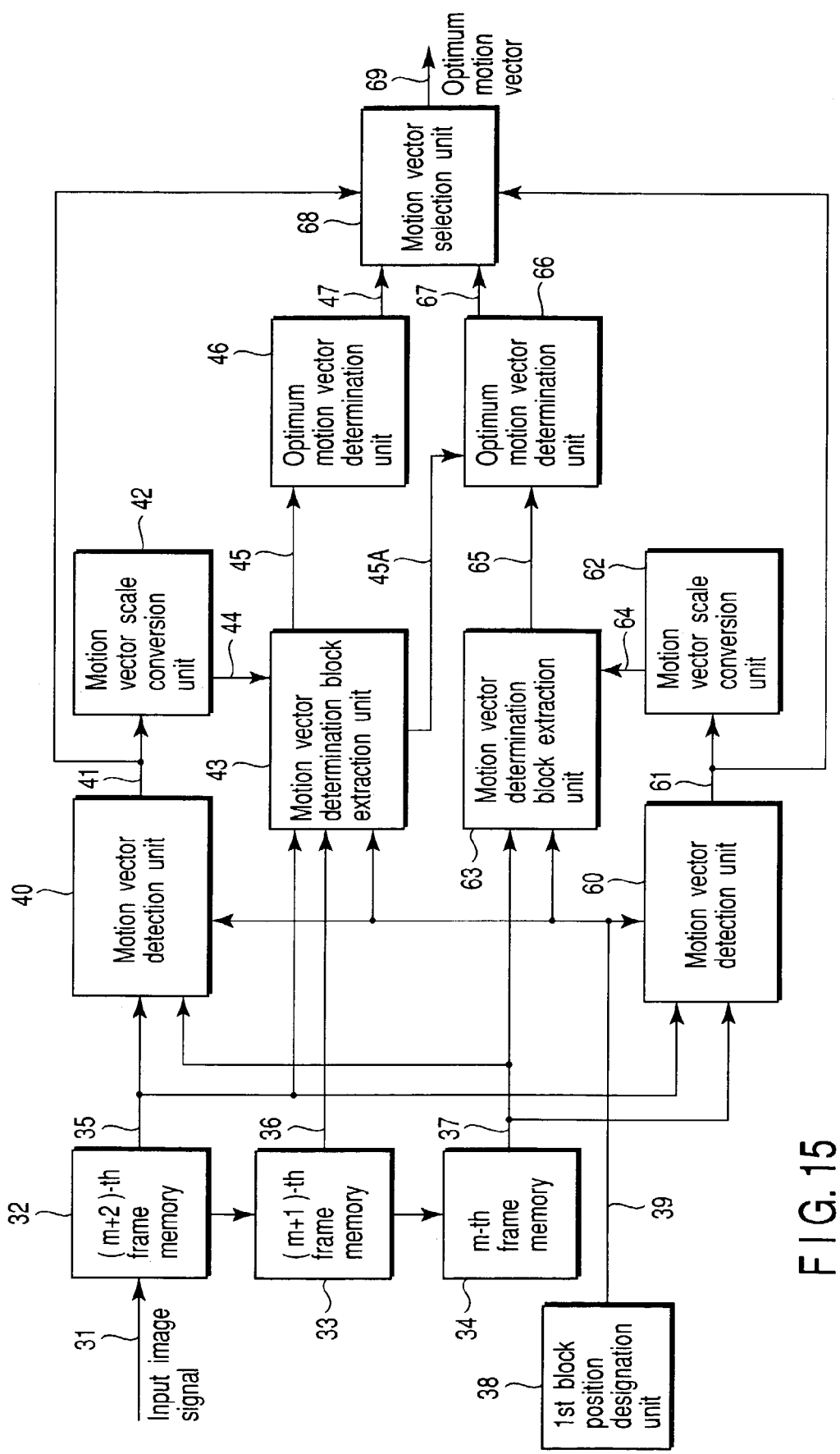
F I G. 15

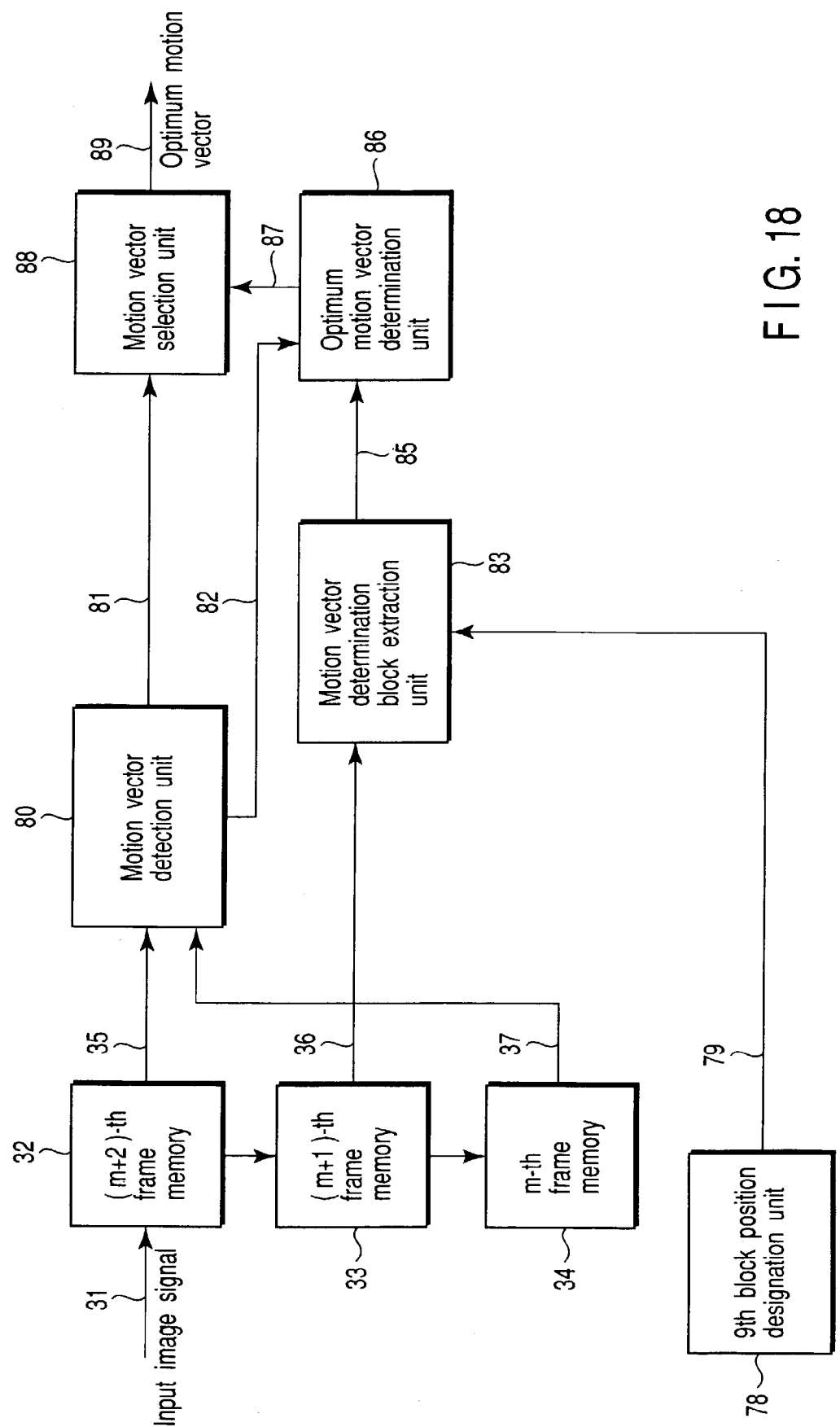
F I G. 18

MOTION VECTOR DETECTION METHOD AND APPARATUS

CROSS-REFERENCE TO RELATED APPLICATIONS

This application is based upon and claims the benefit of priority from the prior Japanese Patent Application No. 2002-073207, filed Mar. 15, 2002, the entire contents of which are incorporated herein by reference.

BACKGROUND OF THE INVENTION

1. Field of the Invention

The present invention relates to a motion vector detection method and apparatus.

2. Description of the Related Art

Generally, an image display unit is classified roughly into an impulse type display that continues to emit light during afterglow time of fluorescent material after writing of image, and a hold model display that continues to display a previous frame till writing of image is performed afresh. There are a CRT display and a field emission type display (referred to as FED) in the impulse type display. There are a liquid crystal display unit (referred to as LCD) and an electroluminescence display (refer to as ELD) in a hold type display unit.

Problems of the hold type display are indistinct phenomena occurring in an image display. The occurrence of the indistinct phenomenon causes in that the images of a plurality of frames are piled up and projected on the retina when a moving object exists in the images over a plurality of frames, and the eyes of an inspection person followed the movement of the moving object.

A display image of a frame continues to be displayed until the display image is changed to that of a frame subsequent thereto. However, an operator is to observe the display image of the frame while predicting that of the frame subsequent thereto and moving the former display image in a moving direction of the moving object. In other words, the tracking motion of eyes of the operator has continuity, and the eyes allows sampling whose interval is shorter than the frame interval. The eyes are therefore casted on an image as if the image were formed between two adjacent frames. As a result, the image is observed as an indistinct image.

The shortening of the frame interval is preferable in order to solve the problem. It is conceivable as a concrete technique to perform interpolation between adjacent frames by forming an interpolation image using motion compensation used in MPEG (Motion Picture Experts Group) 1 and MPEG2. In the motion compensation, a motion vector detected by block matching is used.

MPEG 1 and MPEG2 premise basically to increase a compression ratio, and whether the motion vector reproduces real movement precisely is not matter. Because the error of a motion vector appears as the error of a prediction signal generated by the motion compensation, and the error signal between the prediction signal and the input image signal is encoded by DCT. However, in an image display system such as a hold type display, when an interpolation image is formed by the motion compensation using the motion vector that is not a precision, the display image is deteriorated.

On the other hand, detection methods of high precision are thought since it is required in MPEG 4 to reproduce actual movement using the motion vector. For example, Mr. Tei et al. (Nippon Hoso Kyokai) provides a method of utilizing a data group of rhombuses formed by a plurality of frames and blocks in Jpn. Pat. Appln. KOKAI Publication 10-304369. This technique uses a principle that a usual image performs a uniform motion (including a stationary state) with a plurality of frames, and can expect an improvement of motion vector detection precision.

In a motion vector detection technique described by Jpn. Pat. Appln. KOKAI Publication 10-304369, a measure for inspecting whether a detected motion vector is right really is not provided. For this reason, when an interpolation image is formed by motion compensation using an error motion vector, the possibility that the display image has deteriorated greatly is still left. Further, a process for a large number of frames is necessary to improve detection precision of a motion vector, resulting in increasing a processing time.

BRIEF SUMMARY OF THE INVENTION

According to an aspect of the invention, there is provided a motion vector detection method of detecting a motion vector between a m-th frame (m is an integer) and a (m+n)-th frame (n is an integer not less than i+1 and i is an integer not less than 1), the method comprising: computing a plurality of motion vector candidates between the m-th frame and the (m+n)-th frame; scale-converting the motion vector candidates according to a ratio of a frame difference between a (m+i)-th frame and the (m+n)-th frame to a frame difference between the (m+i)-th frame and the m-th frame; forming virtually an image on the (m+i)-th frame according to each of the scale-converted motion vector candidates; and selecting, from the motion vector candidates, an optimum motion vector that maximizes a correlation between the image virtually formed and an actual image on the (m+i)-th frame.

According to another aspect of the invention, there is provided a motion vector detection method of detecting a motion vector between a m-th frame (m is an integer) and a (m+n)-th frame (n is an integer not less than i+1 and i is an integer not less than 1), the method comprising: extracting a first block from a motion vector search area of the m-th frame; extracting a plurality of second blocks having a large correlation with respect to the first block from a motion vector search area of the (m+n)-th frame; detecting a plurality of first motion vectors between the first block and the plurality of second blocks; extracting, from a (m+i)-th frame, a third block that is located in spatially the same position as that of the first block; computing a plurality of second motion vectors that are (n−1)/n times the first motion vectors; extracting, from the (m+n)-th frame, a fourth block corresponding to a movement position of the third block according to each of the second motion vectors; and selecting, from the plurality of first motion vectors, an optimum motion vector that maximizes a correlation between the third block and the fourth block.

BRIEF DESCRIPTION OF THE SEVERAL VIEWS OF THE DRAWING

FIG. 15 is a block diagram of a motion vector detection apparatus related to the embodiment;

FIG. 18 is a block diagram of a motion vector detection apparatus related to the embodiment;

DETAILED DESCRIPTION OF THE INVENTION

There will now be described an embodiment of the present invention in conjunction with drawings.

THE FIRST EMBODIMENT

Figure 1:
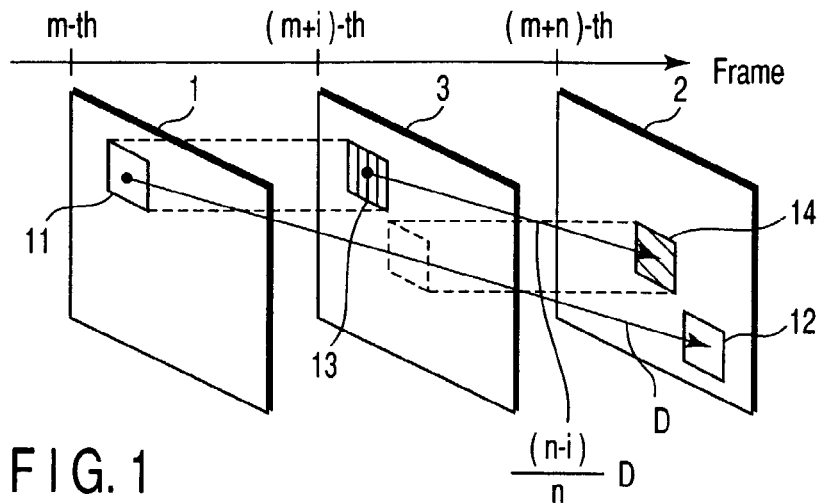
FIG. 1 shows a diagram for explaining a motion vector detection method related to the first embodiment of the present invention.
Figure 2:
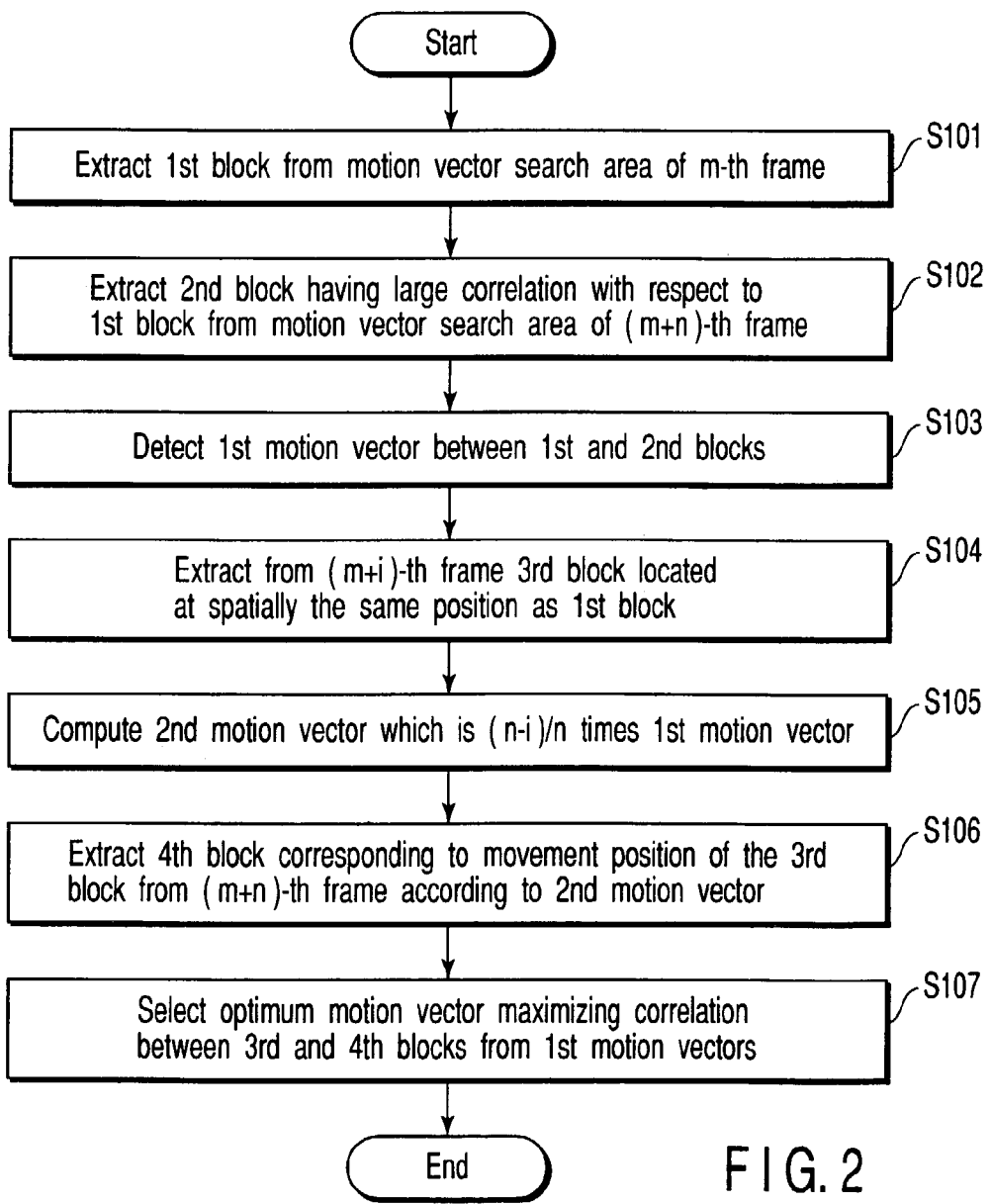
FIG. 2 is a flowchart that shows a motion vector detection procedure related to the embodiment.

As shown in FIG. 1, it is thought to detect an optimum motion vector between an m-th frame (or m-th picture) 1 and a (m+n)-th frame (or (m+n) picture) 2 to form an interpolation image at a time position of a (m+i)-th frame (or (m+i)-th picture) 3 between the m-th frame 1 and the (m+n)-th (n is an integer not less than i+1 and i is an integer not less than 1) frame 2 of an original picture. In the first embodiment of the present invention, an optimum motion vector is detected by a procedure as shown in FIG. 2. The procedure will be described referring to FIGS. 1 and 2.

At first, a first block 11 is extracted from the motion vector search area of the m-th frame 1 (step S101). A plurality of second blocks 12 having the same block size as the first block 11 in the m-th frame 1 and a large correlation with respect to the first block 11 are extracted from the motion vector search area of the (m+n)-th frame 2 (step S102). A method for inspecting the degree of correlation between the blocks in step S102 is described as follows. An absolute value difference of data is computed every pixel in the block, for example, to obtain a plurality of absolute value differences. The absolute value differences are added to obtain an absolute value difference sum. It is determined that the correlation is large when the absolute value difference sum is small, and small when absolute value difference sum is large.

A plurality of first motion vectors D between the first block 11 and the second blocks 12 are detected as a plurality of motion vector candidates (step S103). The third block 13 that is located in spatially the same position as that of the first block 11 in the m-th frame is extracted from a (m+i)-th frame 3 (step S104). From a ratio of a frame difference between the (m+i)-th frame 3 and the (m+n)-th frame 2 to a frame difference i between the m frame 1 and the (m+i)-th frame 3, the first motion vector D is converted into a motion vector of the third block 13 in the (m+i)-th frame 3 to the (m+n)-th frame 2. In other words, the second motion vectors $((n-i)/n)*D$ which were subjected to scale conversion are obtained (step S105). The frame difference is a difference between the frame numbers of two frames.

The fourth block 14 corresponding to a movement position of the third block 13 is extracted according to the second motion vector $((n-i)/n)*D$ (step S106). The fourth block 14 is a part of the image which is virtually formed on the (m+i) frame according to the second motion vector $((n-i)/n)*D$.

If the first motion vector D reproduces actual movement, the same block as the first block 11 should exist in the (m+i)-th frame 3. The position of the block is a position of a dotted line block in FIG. 1. Therefore, relative position relation between the dotted line block and the third block 13 is equal to relative position relation between the second block 12 and the fourth block 14. In the present embodiment, a propriety relative to each of a plurality of first motion vectors D is determined using the third block 13 and the fourth block 14.

By repeating a process for inspecting a correlation between the third block 13 and the fourth block 14, a motion vector that maximizes a correlation between the third block 13 and the fourth block 14 is obtained. In other words, an optimum motion vector that maximizes the correlation between the third block 13 and the fourth block 14 is selected from a plurality of first motion vectors D (step S107). The correlation between the third block 13 and the fourth block 14 is obtained by calculating a sum of absolute value differences of pixels of both blocks. It is determined that when the absolute value difference sum is small, the correlation is large, and when the absolute value difference sum is large, the correlation is small.

In the motion vector detection method of the present embodiment, the first motion vector D that makes the absolute value difference sum E1 computed by the following equation (1) minimum is obtained as an optimum motion vector.

$$E1 = \Sigma \left\{ \alpha \left| f(X+D, m+n) - f(X,m) \right| + \beta \left| f\left(X + \frac{(n-i)}{n}D, m+n\right) - f(X, m+i) \right| \right\} \quad (1)$$

where X indicates a position vector of block, f (A, b) a pixel value corresponding to a position (A) of each block and a frame (b). α and β are weighting factors. The definition of each of these parameters is applied to each embodiment. The first item of the right side of the equation (1) is an absolute difference sum between the first block 11 and the second block 12, and the second item is an absolute difference sum between the third block 13 and the fourth block 14. The weighting factors α and β are used for weighting the absolute value difference of each block, and represented as β≧α to make much of the absolute value difference sum (correlation) between the third block 13 and the fourth block 14 basically. This situation is preferable.

Figure 3:
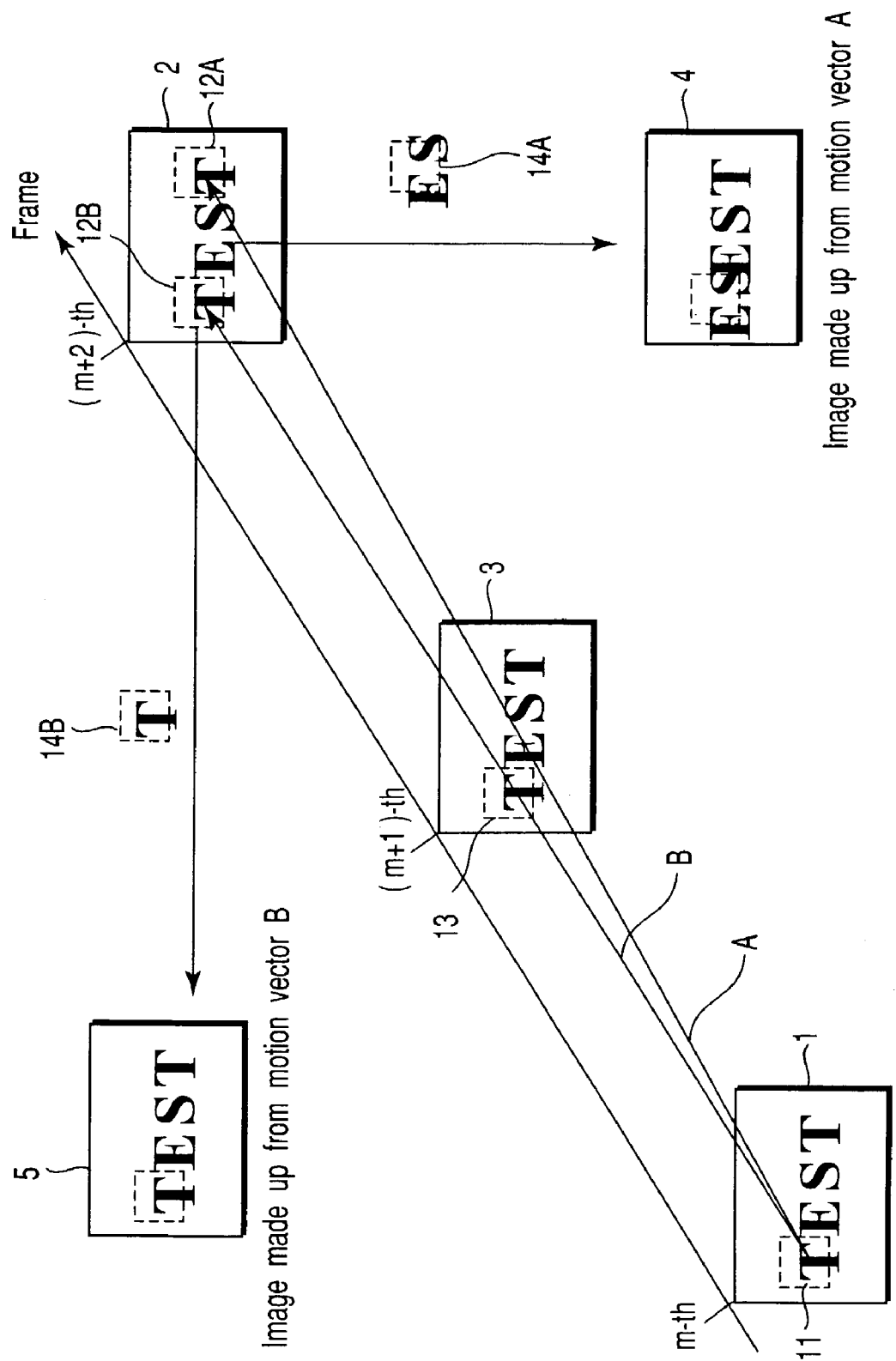
FIG. 3 is a diagram illustrating an output result and effect of an image formed by the embodiment.
Figure 4:
FIG. 4 is a diagram illustrating an example of an image from which an error motion vector is detected.

The effect obtained by the present invention will be described referring to FIGS. 3 and 4. Assuming that i=1 and n=2. Further, assuming that two motion vectors A and B are detected as the first motion vector D, when a still image "TEST" is displayed from the m-th frame 1 to the (m+2)-th frame 2 as shown in FIG. 3. In this case, the motion vector A is a motion vector between the first block 11 on the (m)-th frame 1 and the second block 12A on the (m+2)-th frame 2. The motion vector B is a motion vector between the first block 11 on (m)-th frame 1 and the second block 12B different from the second block 12A on (m+2)-th frame 2.

If an image 14A to be displayed at the position of the third block 13 in the (m+1)-th frame 3 is drawn up according to a motion vector between the m-th frame 1 and the (m+1)-th frame 3 that is obtained by subjecting the motion vector to a scale conversion, it is a part of "ES". On the other hand, when an image 14B to be displayed at the position of the third block 13 of the (m+1)-th frame 2 is drawn up according to a motion vector between the m-th frame 1 and the (m+1)-th frame, which is obtained by subjecting the motion vector B to scale conversion, it is "T".

In the present embodiment, the images 14A and 14B that are drawn up respectively from the motion vectors A and B are compared with the image of actual (m+1)-th frame 3. In other words, the third block 13 is compared with the fourth blocks 14A and 14B. The motion vector B is selected as an optimum motion vector by this comparison. The reason why the motion vector A is detected by mistake is influence of noise as well as that the same characters (this example, T) are included in one still image as shown by the example of "TEST". When noise occurs in "T" to be actually detected in the (m+2)-th frame 2 and a little noise is in "T" indicated by the motion vector as shown in FIG. 4, for example, the motion vector A is detected. In contrast, the probability that the motion vector A is erroneously detected is largely decreased by inspecting a correlation between the third block 13 of (m+1)-th frame 3 and the fourth blocks 14A and 14B according to the present embodiment. This effect was confirmed by the experiment performed by the inventors.

Figure 5:
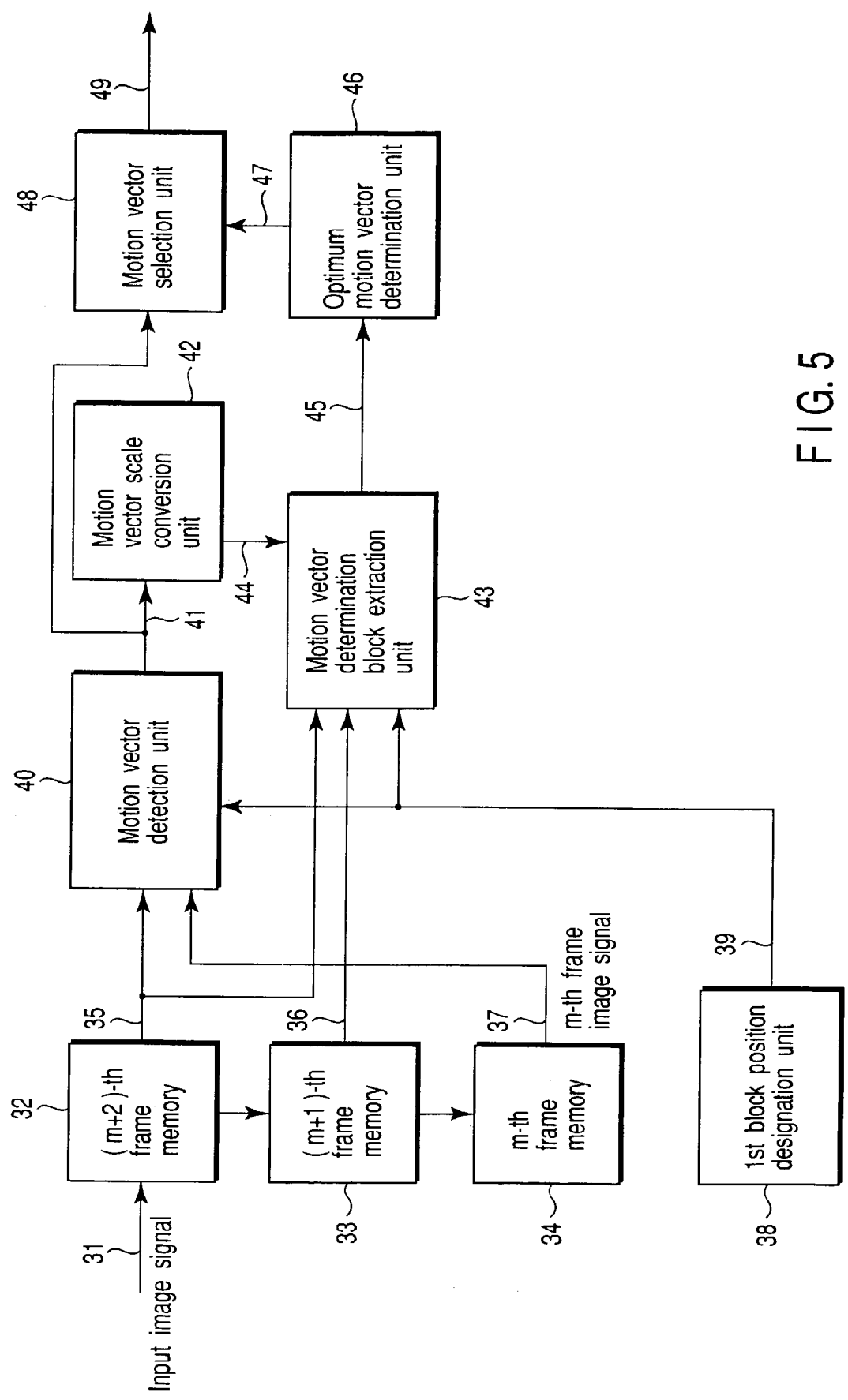
FIG. 5 is a block diagram of a motion vector detection apparatus related to the embodiment.

A configuration of a motion vector detection apparatus that executes the motion vector detection method related to the present embodiment is shown in FIG. 5. Assuming that i=1, n=2 in order to simplify description here. An input image signal 31 is input to a (m+2)-th frame memory 32, a (m+1)-th frame memory 33 and a m-th frame memory 34 in turn, Image signals 35, 36 and 37 of the (m+2)-th frame, (m+1)-th frame and m-th frame are read from the memories 32, 33 and 34.

The motion vector detection unit 40 receives the image signals 35 and 37 of the (m+2)-th and m-th frames, and performs a process of steps S101 to S103 in FIG. 2, namely extraction of the first block from the video signal 37 of the m-th frame, extraction of the second block from the video signal 35 of the (m+2)-th frame and detection of a plurality of first motion vector 41 between the first and the second blocks. A block extraction unit 43 for motion vector determination extracts a block used for determining a motion vector from the video signals 35 and 36 of the (m+2)-th and (m+1)-th frames. An address 39 of a first block position, for example, address of the upper left corner of the block position is output from a first block position designation unit 38 to the motion vector detection unit 40 and the block extraction unit 43.

The motion vector scale conversion unit 42 performs a process of step S105 in FIG. 2, namely, computation of a plurality of second motion vectors (D/2) 44 that is ½ times the first motion vector 41 (D). The block extraction unit 43 performs a process of steps S104 to S106 in FIG. 2, namely, extraction of the third block 13 from video signal 36 of the (m+1)-th frame and extraction of the fourth block 14 from the video signal 35 of the (m+2)-th frame according to the second motion vector 44, and outputs video signals 45 of the third and fourth blocks.

The video signals 45 of the third and fourth blocks from the block extraction unit 43 are inputs to an optimum motion vector determination unit 46, and performs a process for determining as an optimum motion vector a motion vector that maximizes a correlation between the third and fourth blocks in a plurality of first motion vectors 41 maximum. The motion vector selector 48 selects one of the first motion vectors 41 as a final optimum motion vector 49 according to determination result 47 of the optimum motion vector determination unit 46 (S107).

In the present embodiment described above, a motion vector can be precisely obtained from the images of 3 frames, i.e., the m-th, (m+i)-th and (m+n)-th frames. In other words, there is computed a correlation between the third block extracted from the (m+i)-th frame and the fourth block extracted from the (m+n)-th frame using the second motion vector obtained by subjecting a plurality of motion vectors that are candidates of a motion vector to scale conversion, to inspect propriety of each first motion vector. It is possible to detect the motion vector in precision by detecting only a motion vector indicating the maximum correlation as the optimum motion vector and removing motion vectors aside from it.

THE SECOND EMBODIMENT

Figure 6:
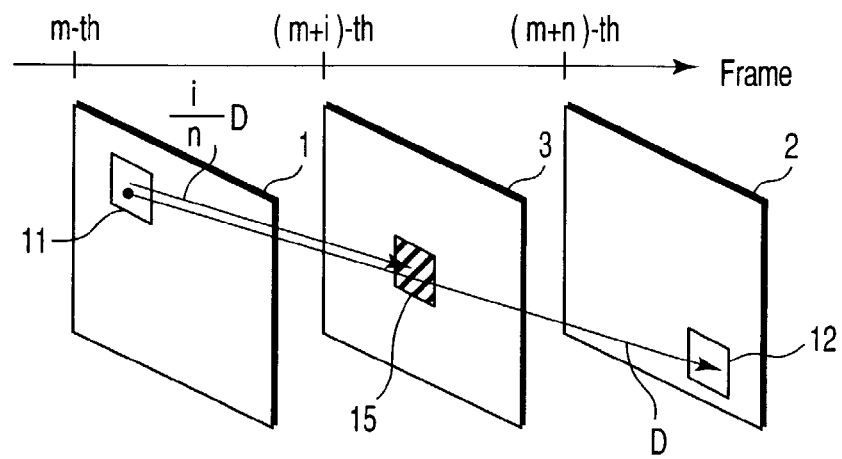
FIG. 6 is a diagram for explaining a motion vector detection method related to the second embodiment of the present invention.
Figure 7:
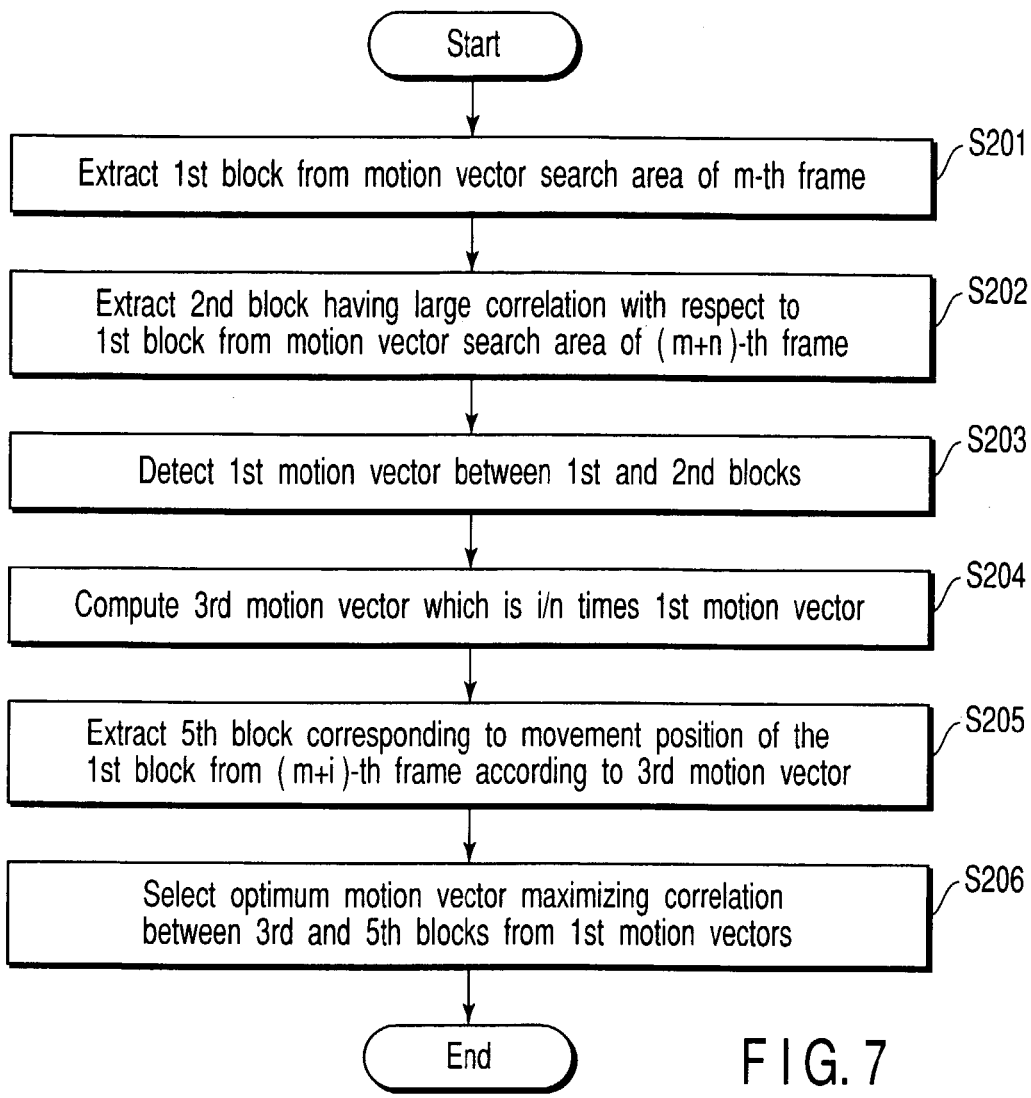
FIG. 7 is a flowchart showing a motion vector detection procedure related to the embodiment.

Another procedure for detecting an optimum motion vector between a m-th frame 1 and a (m+n)-th frame 2 will be described as the second embodiment of the present invention referring to FIGS. 6 and 7.

At first, the first block 11 is extracted from the motion vector search area of the m-th frame 1 (step S201). A plurality of second blocks 12 having the same block size as the first block 11 in the m-th frame 1 and a large correlation with respect to the first block 11 is extracted from the motion vector search area of the (m+n)-th frame 2 (step S202). A method for inspecting the degree of correlation between the blocks in step S102 is described hereinafter. An absolute value difference of pixel data is computed every pixel in the block, for example, to obtain a plurality of absolute value differences. The absolute value differences are added to obtain an absolute value difference sum. It is determined that the correlation is large when the absolute value difference sum is small, and small when absolute value difference sum is large. A plurality of first motion vectors D between the first block 11 and the second blocks 12 are detected as a plurality of motion vector candidates (step S203). The steps S201 to S203 correspond to the steps S101 to S103 of the first embodiment.

In the present embodiment, a plurality of third motion vectors (i/n)*D scale-converted the first motion vector D to a motion vector of the first block 11 in the m-th frame 1 to a (m+i)-th frame 3 are computed based on a ratio of the frame difference n between the m-th frame 1 and the (m+n)-th frame 2 to the frame difference i between the m-th frame 1 and the (m+i)-th frame 3 (step S204). The fifth block 15 which is a movement location of the first block to the (m+i)-th frame 3 is extracted according to the third motion vector (i/n)*D (step S205).

If the first motion vector D reproduces actual movement, the same block as the first block 11 should exist in the (m+i)-th frame 3, and thus the block is located at the fifth block. Therefore, the fifth block 15 and the first block 11 become equal. For this reason, the propriety of each of the first motion vectors D is determined using the first block 11 and the fifth block 15 in the present embodiment.

Concretely, a correlation between the first block 11 and the fifth block 15 is inspected. Repeating of this process provides a motion vector that maximizes the correlation between the first block 11 and the fifth block 15. In other words, an optimum motion vector that maximizes the correlation between the first block 11 and the fifth block 15 is selected from the plurality of first motion vectors D (step S206). The correlation between the first block 11 and the fifth block 15 is obtained by computing an absolute value difference sum of pixels of both blocks. If the absolute value difference sum is small, the correlation is large, and if it is large, the correlation is small.

In the motion vector detection method of the present embodiment described above, one first motion vector D that makes the absolute value difference sum E2 computed by the following equation (2) minimum is determined as an optimum motion vector.

$$E2 = \Sigma \left\{ \alpha \left| f(X+D, m+n) - f(X,m) \right| + \beta \left| f\left(X + \frac{i}{n}D, m+i\right) - f(X,m) \right| \right\} \quad (2)$$

The first term of the right hand side of the equation (2) is an absolute value difference sum between the first block 11 and the second block 12. The second term is an absolute value difference sum between the first block 11 and the fifth block 15. When weighting factors $\alpha$ and $\beta$ are used for weighting the absolute value difference of each block. Fundamentally $\beta \geq \alpha$ is set to make much of the correlation between the first block 11 and the fifth block 15. This situation is preferable.

Figure 8:
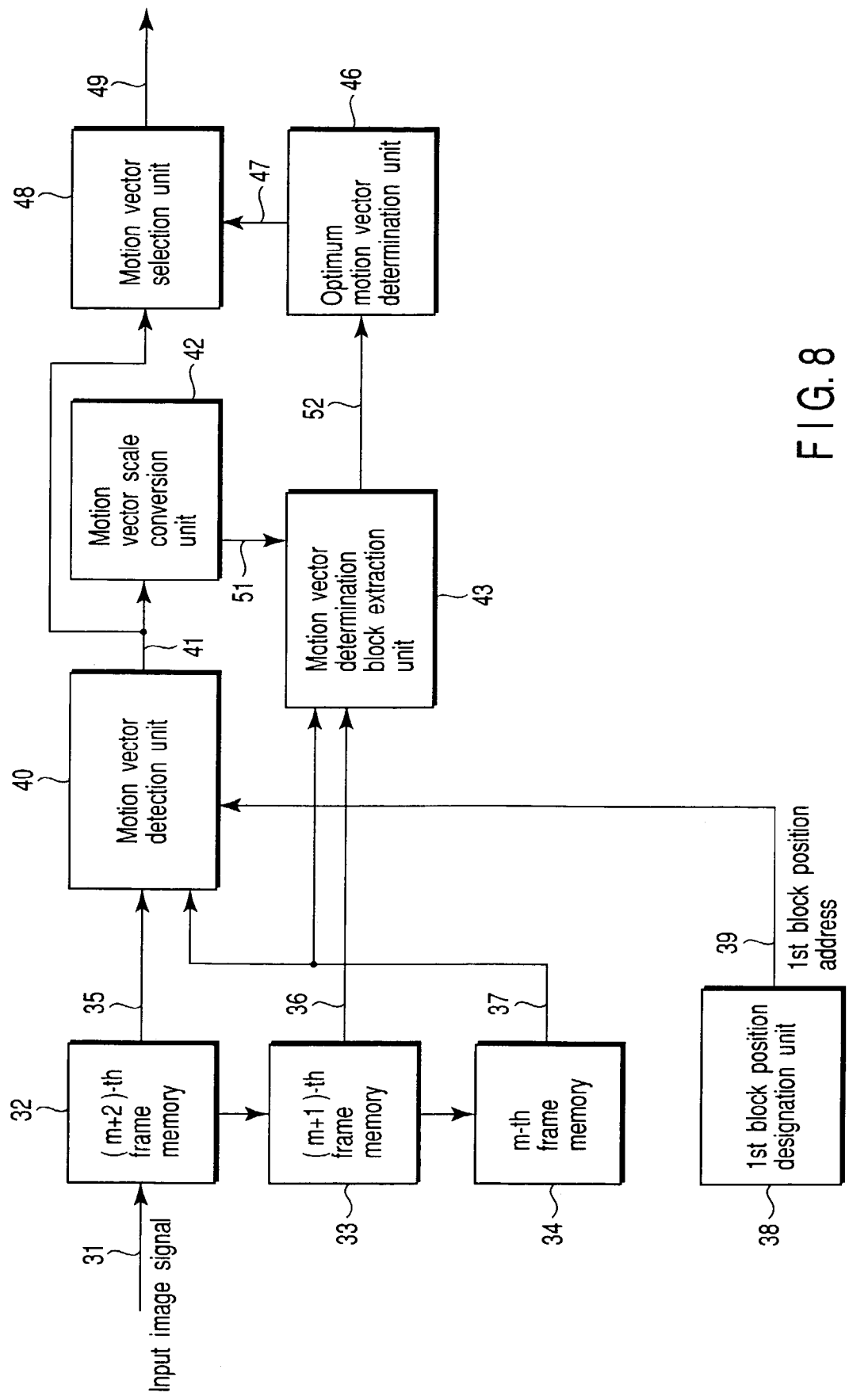
FIG. 8 is a block diagram of a motion vector detection apparatus related to the embodiment.

FIG. 8 shows a configuration of a motion vector detection apparatus that executes the motion vector detection method related to the present embodiment. Assuming that i=1 and n=2 in order to simplify description. The difference between the present embodiment and the first embodiment will be described referring to the same references to elements corresponding to elements shown in FIG. 5. The motion vector scale conversion unit 42 computes a third motion vector (D/2) 51 that is ½ times the first motion vector 41 (D) (S204). The block extraction unit 43 extracts a block for using in a determination of the first motion vector from the video signals 36 and 37 of the (m+1)-th and m-th frames. More specifically, the block extraction unit 43 extracts the fifth block 15 from the video signal 36 of the (m+1)-th frame according to the third motion vector 51 (S205).

The video signal 52 of the fifth block from the block extraction unit 43 is input to the optimum motion vector determination unit 46. The optimum motion vector determination unit 46 selects a motion vector that maximizes the correlation between the first block 11 and the fifth block 15 from a plurality of first motion vectors 41 and determines it as an optimum motion vector. The motion vector selector 48 selects as a final optimum motion vector 35 one of the plurality of first motion vectors 41 according to determination result 47 from the optimum motion vector determination unit 46. The present embodiment can provide the same effect as the first embodiment.

THE THIRD EMBODIMENT

Figure 9:
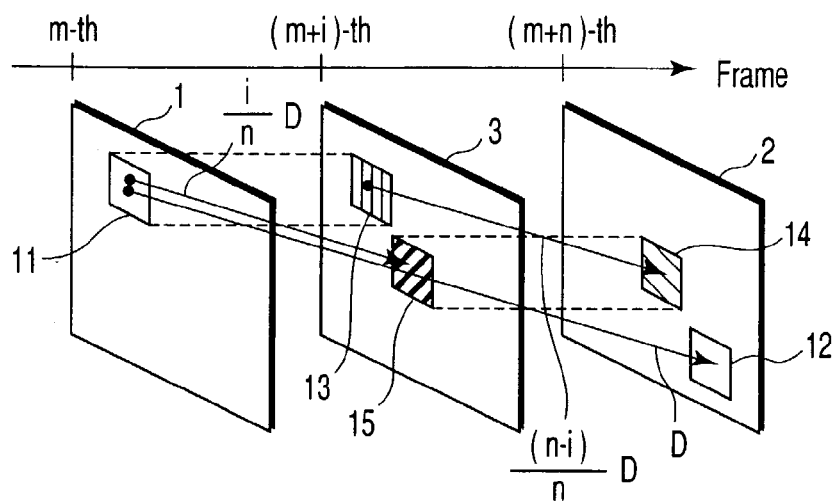
FIG. 9 is a diagram for explaining a motion vector detection method related to the third embodiment of the present invention.
Figure 10:
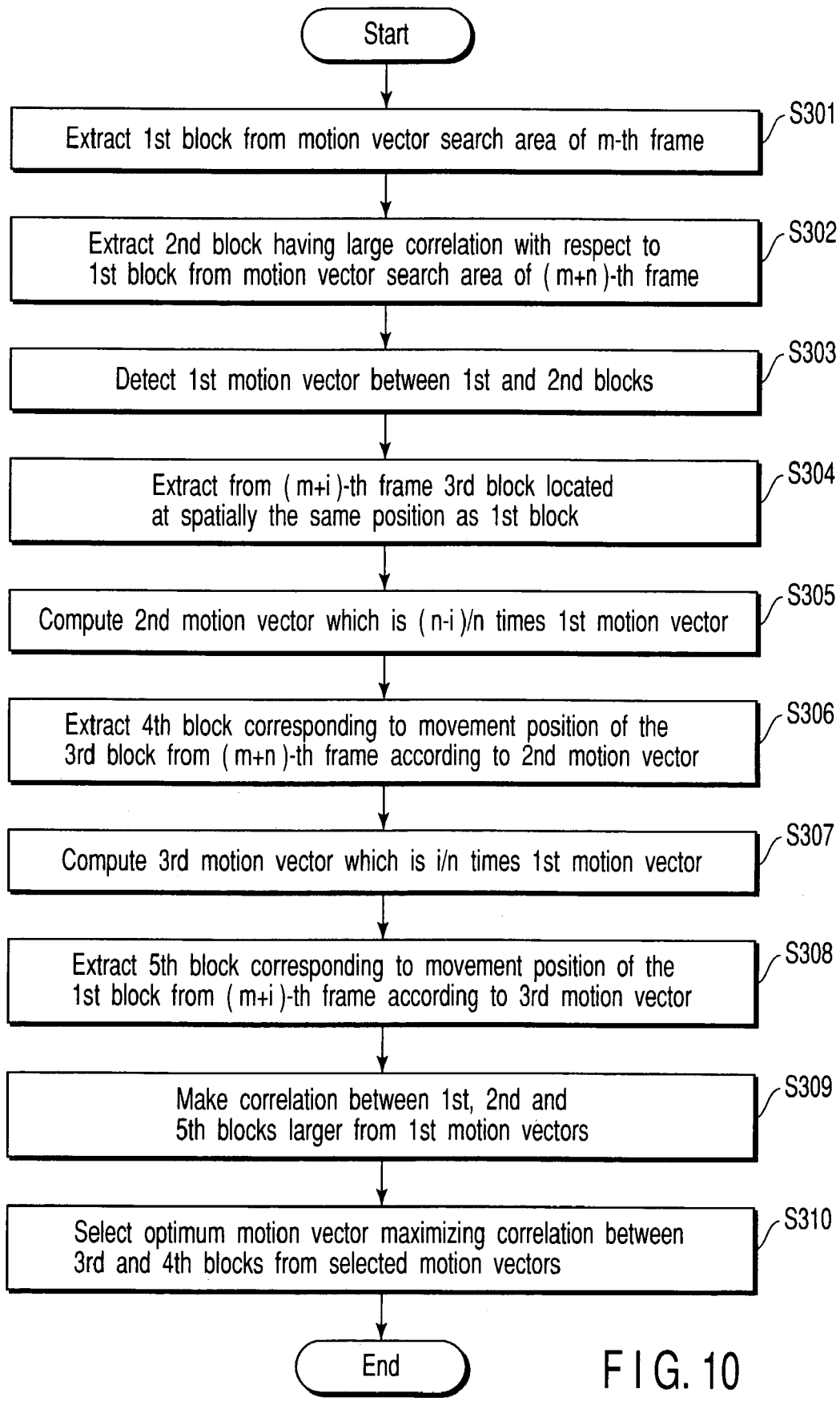
FIG. 10 is a flowchart showing a motion vector detection procedure related to the embodiment.

A motion vector detection method of the third embodiment of the present invention will be described referring to FIGS. 9 and 10. In the present embodiment, at first to fifth blocks 11-15 are extracted according to the procedure (steps S301-S308) similar to that of the first and second embodiments.

Some of the first motion vectors that make a large correlation between these blocks 11, 12 and 15 are selected from the first motion vectors D detected in step S303, using the first, second and fifth blocks 11, 12 and 15 (step S309). The propriety of the first motion vectors D selected in step S309 is determined using the third and fourth blocks 13 and 14. One of the first motion vectors D that maximizes a correlation between the third and fourth blocks 13 and 14 maximum is selected as an optimum motion vector (step S310).

Therefore, in the above mentioned motion vector detection method of the present embodiment, one motion vector that an absolute value difference sum E3 computed according to the following equation (3) becomes minimum is obtained as an optimum motion vector.

$$E3 = \Sigma \left\{ \begin{array}{l} \alpha(|f(X+D,\ m+n) - f(X,m)| + \\ \left|f\left(X + \frac{i}{n}D, m+i\right) - f(X,\ m)\right|) + \\ \beta \left| f\left(X + \frac{(n-i)}{n}D, m+n\right) - f(X, m+i)\right| \end{array} \right\} \quad (3)$$

The first item of the right side of the equation (3) is an absolute value difference sum between the first and second blocks 11 and 12, the second item is an absolute value difference sum between the first and fifth blocks 11 and 15, and the third item is an absolute value difference sum between the blocks 13 and 14. Weighting factors $\alpha$ and $\beta$ are used for weighting the absolute value difference of each block, and represented as $\beta \geq \alpha$ in order to make much of the absolute value difference sum (correlation) between the third block 13 and the fourth block 14 basically. This situation is preferable.

Figure 11:
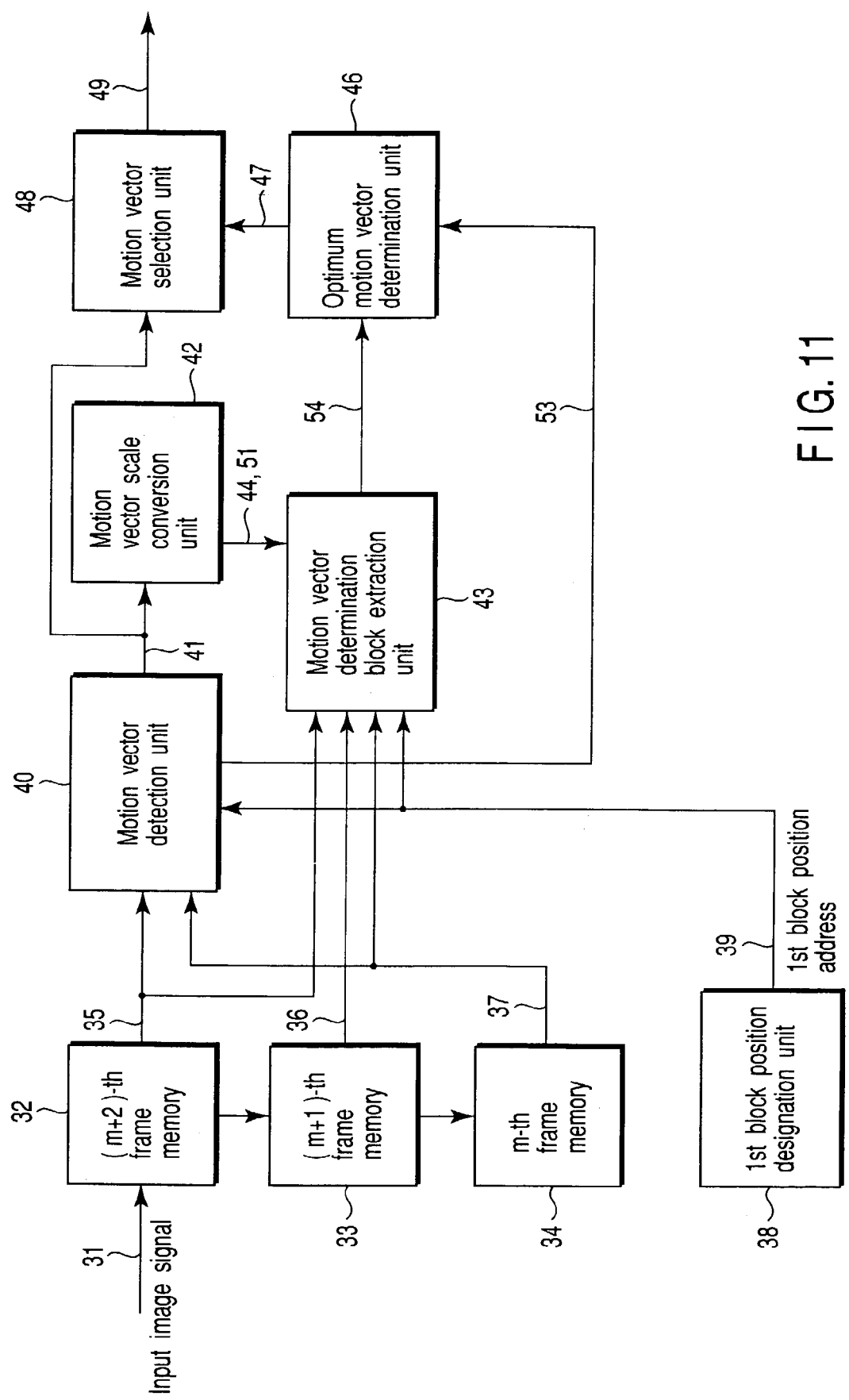
FIG. 11 is a block diagram of a motion vector detection apparatus related to the embodiment.

FIG. 11 shows a configuration of a motion vector detection apparatus which executes a motion vector detection method related to the present embodiment. Assuming that i=1 and n=2 in order to simplify description. The difference between the present embodiment and the first and second embodiments will be described referring to the same references to elements corresponding to elements shown in FIGS. 5 and 8. The motion vector detection unit 40 performs extraction of the first block from the video signal 37 of the m-th frame, extraction of the second block from the video signal 35 of a (m+2)-th frame, and detection of a plurality of first motion vectors 41 between the first block and the second block (D). The video signal 53 of the first and second blocks is output to the optimum motion vector determination unit 46 (steps S301-S303).

The motion vector scale conversion unit 42 computes the second motion vector 44 that is (n−i)/n of the first motion vector and the third motion vector 51 that is i/n of the first motion vector. However, since i=1 and n=2s, a motion vector (D/2) that is ½ times the first motion vector (D) is calculated as the second and third motion vectors (steps S305 and S307).

The block extraction portion 43 extracts blocks used for a determination of a motion vector from the video signals 35, 36 and 37 of the (m+2)-th, (m+1)-th and m-th frames. More specifically, the block extraction unit 43 extracts the third block 13 from the video signal 36 of a (m+1)-th frame, the fourth block 14 from video signal 35 of a (m+2)-th frame according to the second motion vector 44, and the fifth block 15 from the video signal 36 of the (m+1)-th frame according to the third motion vector 51, and outputs video signals 54 of the third, fourth and fifth blocks (step S306 and S308).

The video signals 54 of the third, fourth and fifth blocks from the block extraction unit 43 are inputs to the optimum motion vector determination unit 46. In the optimum motion vector determination unit 46, a plurality of motion vectors that make a large correlation between the first block 11 and the second and fifth blocks 12 and 15 are selected from the first motion vectors 41. Furthermore, one motion vector that maximizes a correlation between the third block 13 and the fourth block 14 is determined as an optimum motion vector (S309). The motion vector selector 48 selects an optimum motion vector according to determination result 47 from the optimum motion vector determination unit 46 to output it as a final optimum motion vector 49 (S310).

As thus described, the present embodiment enables to detect a motion vector more precisely with the configuration that combines the first and second embodiments.

THE FOURTH EMBODIMENT

Figure 12:
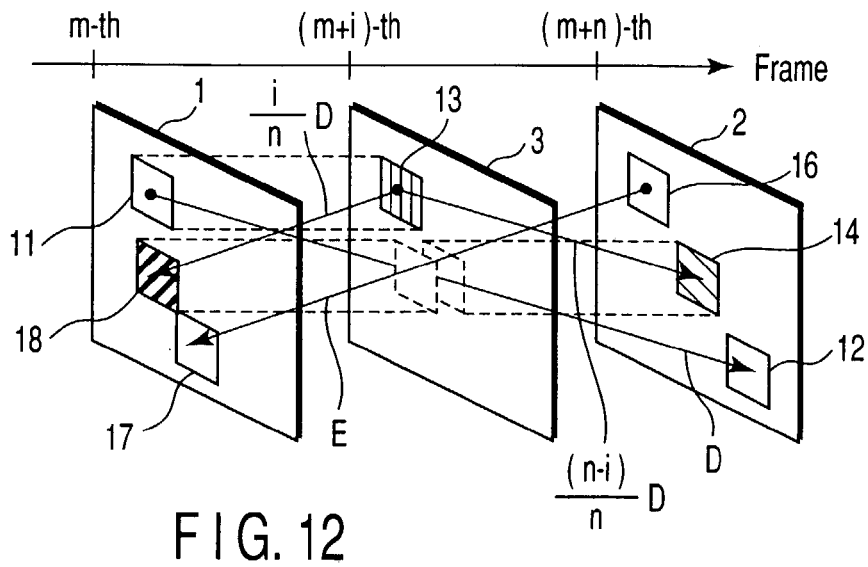
FIG. 12 is a diagram for explaining a motion vector detection method related to the fourth embodiment of the present invention.

The fourth embodiment of the present invention will be described in conjunction with FIGS. 12-14. In the present embodiment, when an interpolation image is made up at the position of a (m+i)-th frame 3 between the m-th frame 1 and (m+n)-th frame 2, both of the first motion vector D from the m-th frame 1 to a (m+n)-th frame 2 and the fourth motion vector E from the (m+n)-th frame 2 to the m-th frame 1 are obtained. The detection of the first motion vector D is performed similar to the first embodiment (steps S401-S406 and S412).

Detection of the fourth motion vector E is performed as follows. The sixth block 16 that is located in spatially the same position as that of the first block 11 are extracted from the (m+n)-th frame (step S407). The seventh block 17 having a large correlation with respect to the sixth block 16 is extracted from a plurality of blocks of the same block size as the sixth block 16 in a motion vector search area in the m-th frame 1 (step S408). The fourth motion vector E between the sixth block 16 and the seventh block 17 is detected (step S409). The correlation between the blocks is obtained by computing an absolute value difference sum of pixels of both blocks. When the absolute value difference sum is small, the correlation is large, and when it is large, the correlation is small.

The fifth motion vector (i/n)*E corresponding to the fourth motion vector E scale-converted by movement quantity of the sixth block 16 from the (m+i)-th frame 3 to the m-th frame 1 is computed from a ratio of a frame difference i between the m-th frame 1 and the (m+i)-th frame 3 to a frame difference n between the (m+n)-th frame 2 and the m-th frame 1 (step S410). The eighth block 18 is extracted according to the fifth motion vector (i/n)*E (step S411). The eight block 18 corresponds to a movement position of the third block 13 to the m-th frame 1 which is in the (m+i)-th frame 3 and at the same position as the first block 11 of the m-th frame 1.

The selection of the first optimum motion vector in step S412 is performed similar to the first embodiment. In other words, the absolute value difference sum between the third block 13 and the fourth block 14 is computed to inspect a correlation, and one motion vector that maximizes the correlation between the third block 13 and the fourth block 14 is selected from the first motion vectors. In selection of the fourth optimum motion vector in step S413, one motion vector that maximizes the correlation between the third block 13 and the eighth block 18 is selected from the fourth motion vectors.

The absolute value difference sum E1 between the third block 13 and the fourth block 14 is compared with the absolute value difference sum E4 between the third block 13 and the eighth block 18 (step S414), and the motion vector that the absolute value difference sum is small is adopted. In other words, when E1 is smaller than E4, the optimum first motion vector detected in step S412 is selected as the optimum motion vector (step S415). When E4 is smaller than E1, the inverse vector -E of the optimum fourth motion vector detected in step S413 is selected as the optimum motion vector (step S416).

The absolute value difference sum E4 computed for obtaining the fourth motion vector in the present embodiment can be expressed by the following equation (4).

$$E4 = \Sigma \left\{ \alpha \left| f(X, m+n) - f(X+E, m) \right| + \beta \left| f\left(X + \frac{i}{n}E, m\right) - f(X, m+i) \right| \right\} \quad (4)$$

It is desirable that weighting factors $\alpha$ and $\beta$ use the same as a value used for obtaining E1.

FIG. 15 shows a configuration of a motion vector detection apparatus which executes a motion vector detection method related to the present embodiment. Assuming that i=1 and n=2 in order to simplify description. The difference between the present embodiment and the first embodiment will be described referring to the same references to elements corresponding to elements shown in FIG. 5. In FIG. 15, a motion vector detection unit 60, a motion vector scale conversion unit 62, a block extraction unit 63 for motion vector determination, and an optimum motion vector determination unit 66 are newly provided. The motion vector detection unit 40, motion vector scale conversion unit 42, block extraction unit 43, and optimum motion vector determination unit 46 are identical to those of the first embodiment, a process of steps S401-S406 and S412 in FIG. 13 is performed by these units.

Figure 13:
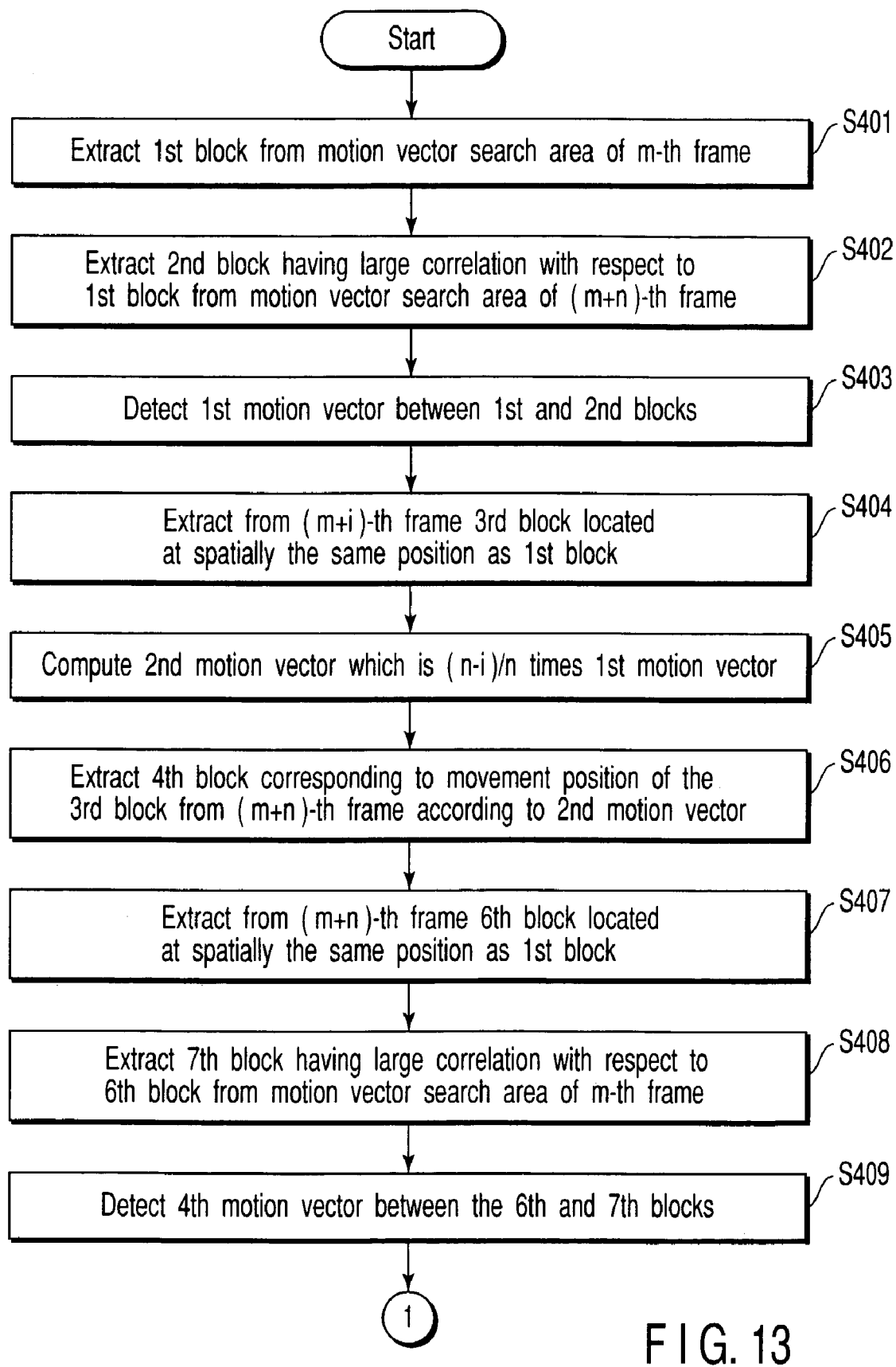
FIG. 13 is a flowchart showing a motion vector detection procedure related to the embodiment.
Figure 14:
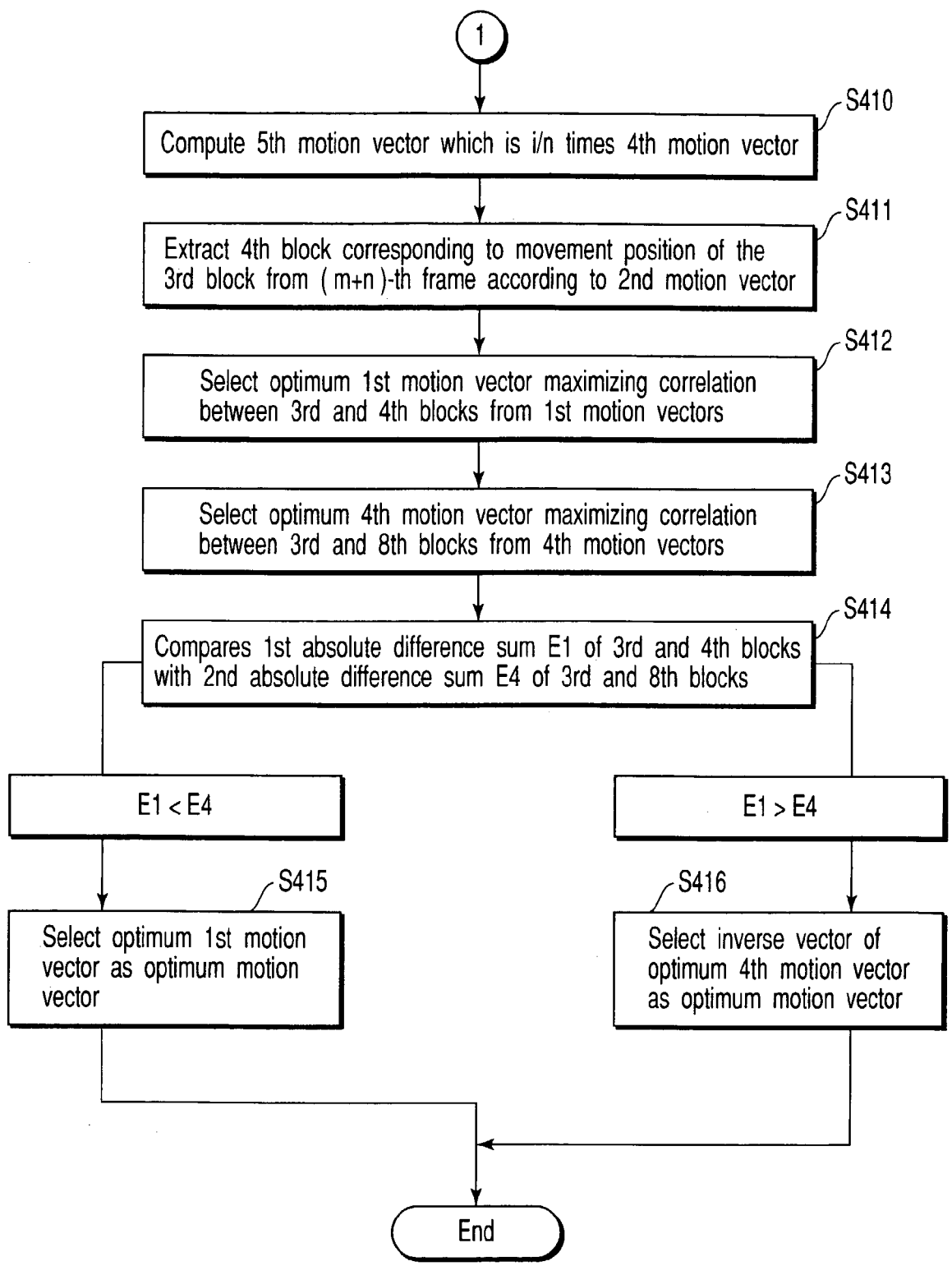
FIG. 14 is a flowchart showing the motion vector detection procedure related to the embodiment.

The motion vector detection unit 60 performs the process of steps S407-S409 in FIG. 13. In other words, the sixth block 16 is extracted in the motion vector search area from the (m+2)-th frame. The seventh block 17 of the same block size as the sixth block 16 is extracted from the motion vector search area of the m-th frame 1. The fourth motion vector 61 between the sixth block 16 and the seventh block 17 is detected.

The position designation of the sixth block 16 is performed by the first block position designation unit 38. An address of the first block position, for example, address 39 of an upper left corner is output to the motion vector detection unit 60 and the block extraction unit 63. The motion vector scale conversion unit 62 computes a plurality of fifth motion vectors 64 that are ½ times the fourth motion vector 61 (S410). The block extraction unit 63 extracts the eighth block 18 from the video signal 37 of the m-th frame according to the fifth motion vector 64, and outputs a video signal 65 of the eighth block 18 (S411).

The video signal 45A of the third block from the block extraction unit 43 and the video signal 65 of the eighth block from the block extraction unit 63 are input to the optimum motion vector determination unit 66. The optimum motion vector determination unit 66 determines as the optimum fourth motion vector a motion vector in the fourth motion vectors 61 that maximizes a correlation between the third block 13 and the eighth block 18 (step S413).

The motion vector selection unit 68 selects an optimum motion vector according to determination results 47 and 67 from the optimum motion vector determination units 46 and 66 (step S415, S416), and outputs the selected motion vector as a final optimum motion vector 69.

According to the present embodiment, the process for acquiring the optimum fourth motion vector from the m-th frame to the (m+n)-th frame in the first embodiment is combined with the process for acquiring the optimum fourth motion vector from the (m+n)-th frame to the m-th frame that is reversed in time with respect to the above process. The optimum one of the optimum fourth optimum motion vectors provided by these processes is selected as a final optimum motion vector, whereby the motion vector detection precision is improved more.

THE FIFTH EMBODIMENT

Figure 16:
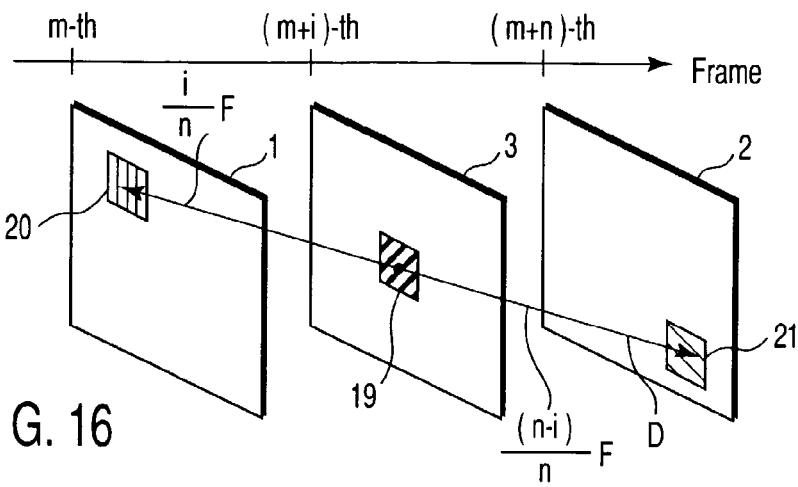
FIG. 16 is a diagram for explaining a motion vector detection method related to the fifth embodiment of the present invention.
Figure 17:
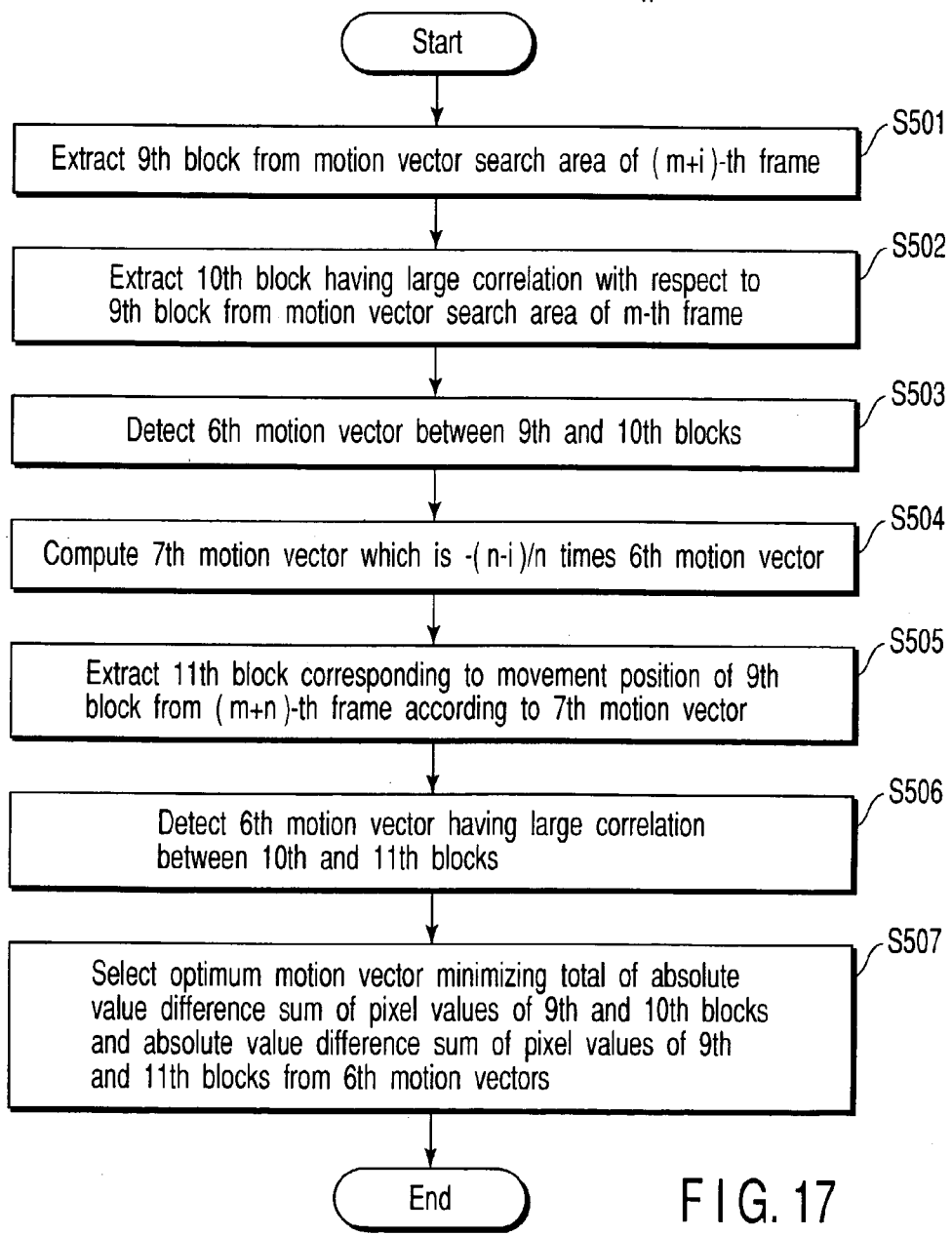
FIG. 17 is a flowchart that shows motion vector detection procedure related to the embodiment.

The fifth embodiment of the present invention will be described referring to FIGS. 16 and 17. In the present embodiment, at first the ninth block 19 is extracted from a motion vector search target of the (m+i)-th frame 3 in order to obtain a motion vector between the m-th frame 1 and the (m+n)-th frame 2 (step S501). A plurality of tenth blocks 20 are extracted from the motion vector search area of the m-th frame 1 (step S502).

The sixth motion vector F between the ninth block 19 and the tenth block 20 is detected as a motion vector from the ninth block 19 to the m-th frame 1 (step S503). As a motion vector from the ninth block 19 to the (m+n)-th frame 2 is computed the seventh motion vector—((n−i)/i)*F having a direction opposite to the sixth motion vector F and a size satisfying a ratio of a frame difference between the (m+i)-th frame 3 and the (m+n)-th frame 2 (n−i) to a frame difference i between the m-th frame 1 and the (m+i)-th frame 3 (step S504). The eleventh block 21 corresponding to a movement location of the ninth block 19 is extracted from the (m+n)-th frame 2 according to the seventh motion vector—((n−i)/i)*F (step S505).

A plurality of sixth motion vectors F that make a large correlation between the tenth block 20 and the eleventh block 21 are detected (step S506). If the sixth motion vector F reproduces actual movement, the same block as the tenth block 20 or the eleventh block 21 must exist in (m+i)-th frame 3. The position of that block is located at the ninth block 19. In the present embodiment, the image of the ninth block 19 is extracted from the (m+i)-th frame 3, the propriety of the sixth motion vector F is determined using the images of the ninth block 19, the tenth block 20 and the eleventh block 21. Concretely, the correlation between the tenth block 20 and the eleventh block 21 is inspected, and a plurality of sixth blocks that makes the correlation larger are extracted. Furthermore, the correlation between the ninth block 19 and the tenth block 20 is inspected, and one of the sixth motion vectors that maximize the correlation is selected as the optimum motion vector.

The absolute value difference sum E5 that is computed in the present embodiment is expressed by the following equation (5).

$$E5 = \Sigma \left\{ \alpha \left| f(X+F,m) - f\left(X - \frac{(n-i)}{i}F, m+n\right) \right| + \beta \left| f(X+F,m) - f(X, m+i) \right| \right\} \quad (5)$$

The correlation between the ninth block 19 and the tenth block 20 in an equation (5) is inspected in this embodiment, but the correlation between the ninth block 19 and the eleventh block 21 may be inspected. In this case, the absolute value difference sum E6 is expressed by the following equation (6).

$$E6 = \Sigma \left\{ \alpha \left| f(X+F,m) - f\left(X - \frac{(n-i)}{i}F, m+n\right) \right| + \beta \left| f\left(X - \frac{(n-i)}{i}F, m+n\right) - f(X, m+i) \right| \right\} \quad (6)$$

Weighting factors $\alpha$ and $\beta$ in the equations (5) and (6) are $\beta \geq \alpha$. This situation is preferable.

Furthermore, the correlation can be inspected from the ninth and tenth blocks 19 and 20 and the ninth and eleventh blocks 19 and 21. In this case, the absolute value difference sum E7 is expressed by the following equation (7).

$$E7 = \Sigma \left\{ \begin{array}{l} \alpha \left| fl(X+F,m) - f\left(X - \frac{(n-i)}{i}F, m+n\right) \right| + \\ \beta \left| f(X+F,m) - f(X, m+i) \right| + \\ \gamma \left| f\left(X - \frac{(n-i)}{i}F, m+n\right) - f(X, m+i) \right| \end{array} \right\} \quad (7)$$

The block having a large correlation in a time direction is attached great importance with respect to the weighting factors $\alpha$ and $\beta$. In other words, n−i and i are compared to each other, the block between frames corresponding to small one of n−i and i is attached great importance. For example, in the event of i=1 and n=3, the correlation between the ninth block 19 and the tenth block 20 is attached great importance because of n−i=2. Therefore, it is preferable that $\alpha$ is larger than $\beta$.

In the present embodiment, a motion vector F that E5, E6 or E7 of equation (5), (6) and (7) is minimum is obtained as an optimum motion vector.

FIG. 18 shows a configuration of a motion vector detection apparatus that executes the motion vector detection method related to the present embodiment. Assuming that i=1 and n=2 in order to simplify description. The difference between the present embodiment and the first and second embodiments will be described referring to the same references to elements corresponding to elements shown in FIG. 5.

The block extraction unit 83 for motion vector determination extracts the ninth block 19 in a motion vector search area from the video signal 36 of the (m+1)-th frame (S501). The ninth block position designation unit 78 designates the position of the ninth block 19. An address of the ninth block position, for example, address 79 of an upper left corner is output to the block extraction unit 83.

The motion vector detection unit 80 performs a process of steps S502-S506. In other words, the sixth motion vector F that is a motion vector from the (m+i)-th frame 3 to the m-th frame 1 is detected. The seventh motion vector that is reverse with respect to the motion vector F and is ½ thereof is computed. The tenth block 20 of the m-th frame 1 and the eleventh block 21 of the (m+n)-th frame 2 are extracted with respect to the ninth block 19 using the sixth motion vector and the seventh motion vector. The motion vector detection unit 80 outputs a plurality of sixth motion vectors 81 that make a large correlation between the tenth block 20 and the eleventh block 21 and a video signal 82 of the tenth block 20.

The optimum motion vector determination unit 86 determines as an optimum motion vector a motion vector in the sixth motion vectors 81 that maximize the correlation between the ninth block 19 and the tenth block 20. The motion vector selection unit 88 selects an optimum motion vector according to determination result 87 from the optimum motion vector determination portion 86 (S507) and outputs a selected motion vector as a final optimum motion vector 89.

The configuration that determines the correlation between the tenth block 20 and the ninth block 19 is described in the above embodiment. When the correlation between the eleventh block 21 and the ninth block 19 is determined as described above, the determination can be executed by the similar configuration.

THE SIXTH EMBODIMENT

Figure 19:
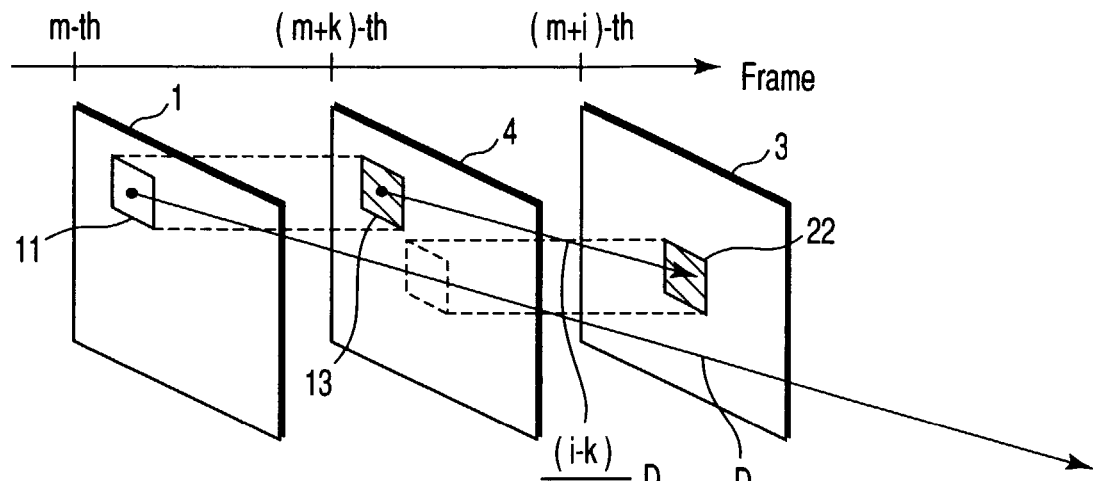
FIG. 19 is a diagram for explaining an interpolation image forming method related to the sixth embodiment of the present invention.
Figure 20:
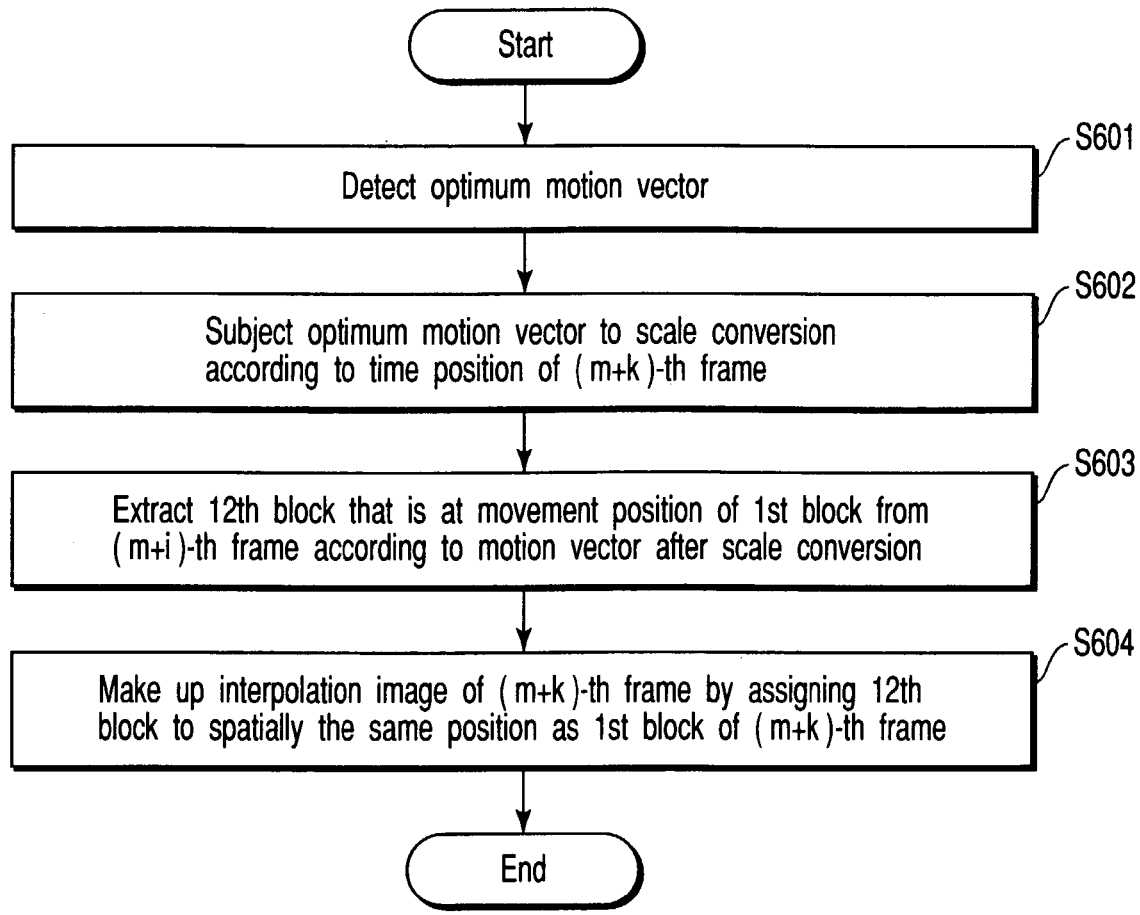
FIG. 20 is a flowchart that shows an interpolation image forming procedure related to the embodiment.

An interpolation image forming method with the use of a motion compensation based on a motion vector detection will be explained as the sixth embodiment of the present invention in conjunction with FIGS. 19 and 20.

The interpolation image forming method related to the present embodiment forms an interpolation image by extracting the twelfth block 22 using a motion vector obtained by scale-converting the optimum motion vector D acquired by the first embodiment, and assigning the twelfth block 22 to spatially the same position as the first block of an interpolation frame. More specifically, when an interpolation image is formed at position of a (m+k)-th (k is arbitrary actual number) frame between an m-th frame (m is arbitrary integer) and a (m+n)-th frame (n is an integer not less than i+1 and i is an integer not less than 1) of an original picture, for example, at the position of the (m+k)-th frame between the m-th frame 1 and a (m+i)-th frame 3 as shown in FIG. 19, at first an optimum motion vector D between the m-th frame 1 and the (m+n)-th frame 2 is acquired, and then the optimum motion vector D is subjected to scale conversion according to a time position of the (m+k)-th frame (steps S601 and S602) similar to the first embodiment. In other words, a movement quantity of the block on the (m+k)-th frame that is located in spatially the same position as that of the first block 11 and moves from the (m+k)-th frame to the (m+i)-th frame 3, that is, a motion vector ((i−k)/n)*D is computed from a ratio of a frame difference n between the m-th frame 1 and the (m+n)-th frame 2 to a frame difference (i−k) between the (m+k)-th frame and (m+i)-th frame 3.

The twelfth block 22 corresponding to a movement position of the first block 11 from the (m+i)-th frame 3, that is, twelfth block 22 corresponding to the movement position of the block 13 on the (m+k)-th frame that is located in spatially the same position as that of the first block 11 and moves to the (m+i)-th frame 3 is extracted according to the motion vector ((i−k)/n)*D after scale conversion (step S603).

The twelfth block 22 is assigned to spatially the same position as the first block of the (m+k)-th frame to form an interpolation image of the (m+k)-th frame (step S604). Since the blocks on the (m+k)-th frame are formed of blocks located at spatially the same position from the m-th frame 1, they are in a manner spread on the (m+k)-th frame. Interpolation images can be formed without clearance and overlapping by forming each interpolation image in correspondence with each block.

The interpolation image can be formed on a frame between the m-th frame 1 and the (m+i)-th frame 3 as described before, and also on a frame between the (m+i)-th frame 3 and the (m+n)-th frame 2 using the same motion vector D. Assuming that i=1 and n=2, for example, a (m+0.5)-th frame image (between the m-th frame 1 and the (m+1)-th frame) and a (m+1.5)-th frame image (between the (m+1)-th frame and the (m+2)-th frame) are approximately simultaneously obtained using the motion vector D detected from the m-th frame 1 and the (m+2)-th frame. This can shorten computation time in comparison with a system which computes a motion vector between m-th frame 1 and the (m+1)-th frame, forms a (m+0.5)-th frame using the motion vector, computes another motion vector between the (m+1)-th frame and the (m+2)-th frame, and forms a (m+1.5)-th frame using the another motion vector.

Further, when computation process affords in processing time, the following method is available. At first the (m+0.5)-th frame image and (m+1.5)-th frame image are computed using the motion vector D1 detected by the m-th frame 1 and (m+2)-th frame, and then the (m+1.5)-th frame image and (m+2.5)-th frame image are computed using another motion vector D2 detected by the (m+1)-th frame and (m+3)-th frame. Furthermore, a correlation between the (m+1.5)-th frame image and the (m+2)-th frame image is inspected, and each block is selected so that a correlation with respect to the (m+2)-th frame image becomes large.

THE SEVENTH EMBODIMENT

Figure 21:
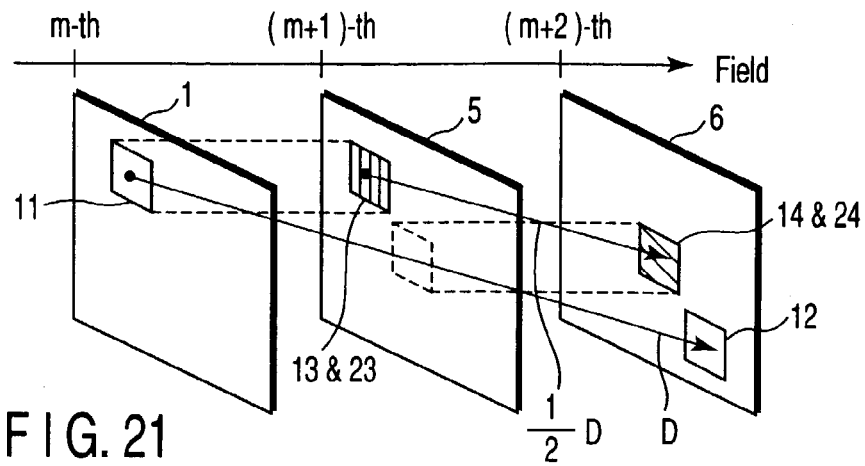
FIG. 21 is a diagram for explaining a motion vector detection method related to the seventh embodiment of the present invention.
Figure 22:
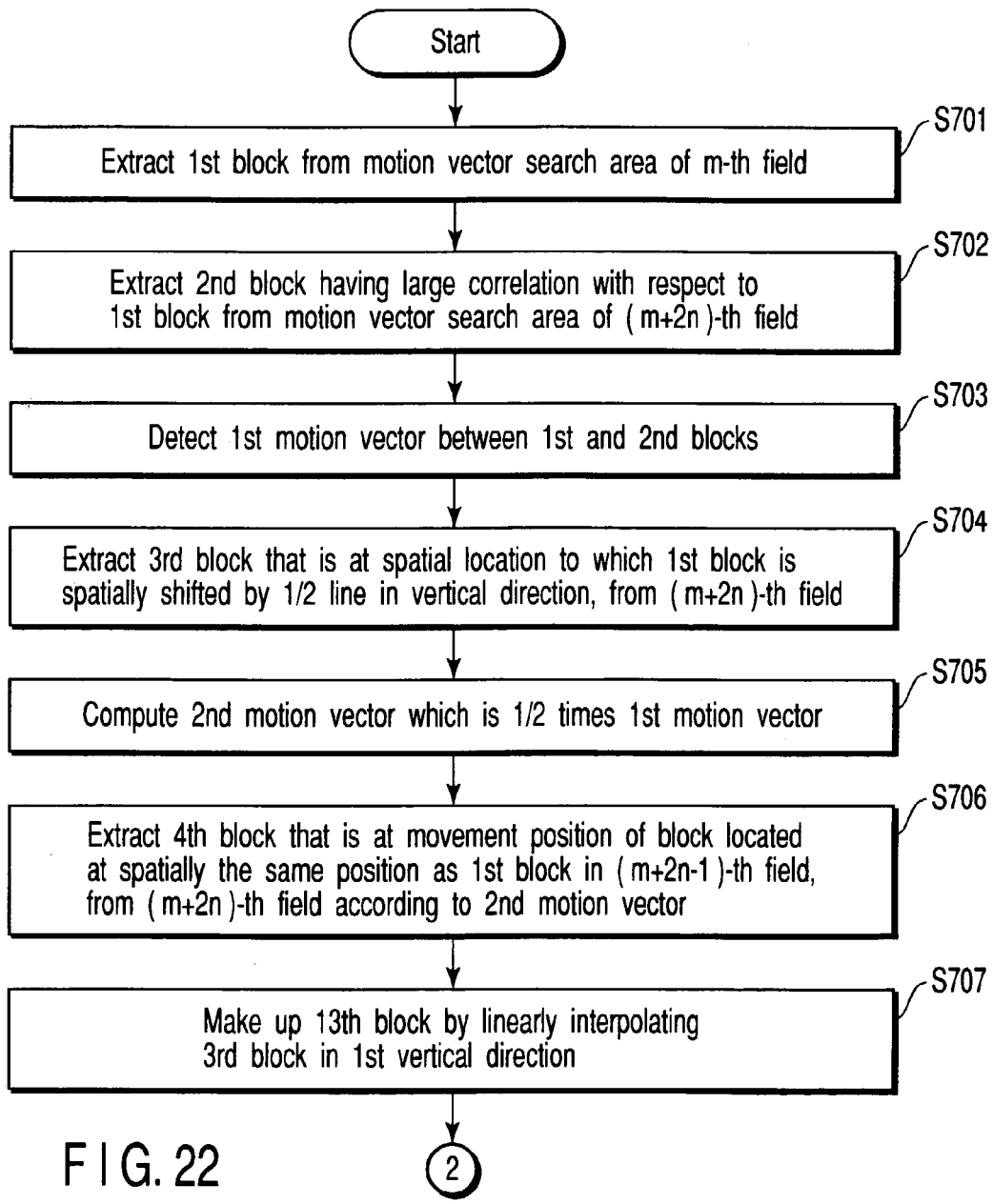
FIG. 22 is a flowchart that shows a motion vector detection procedure related to the embodiment.
Figure 23:
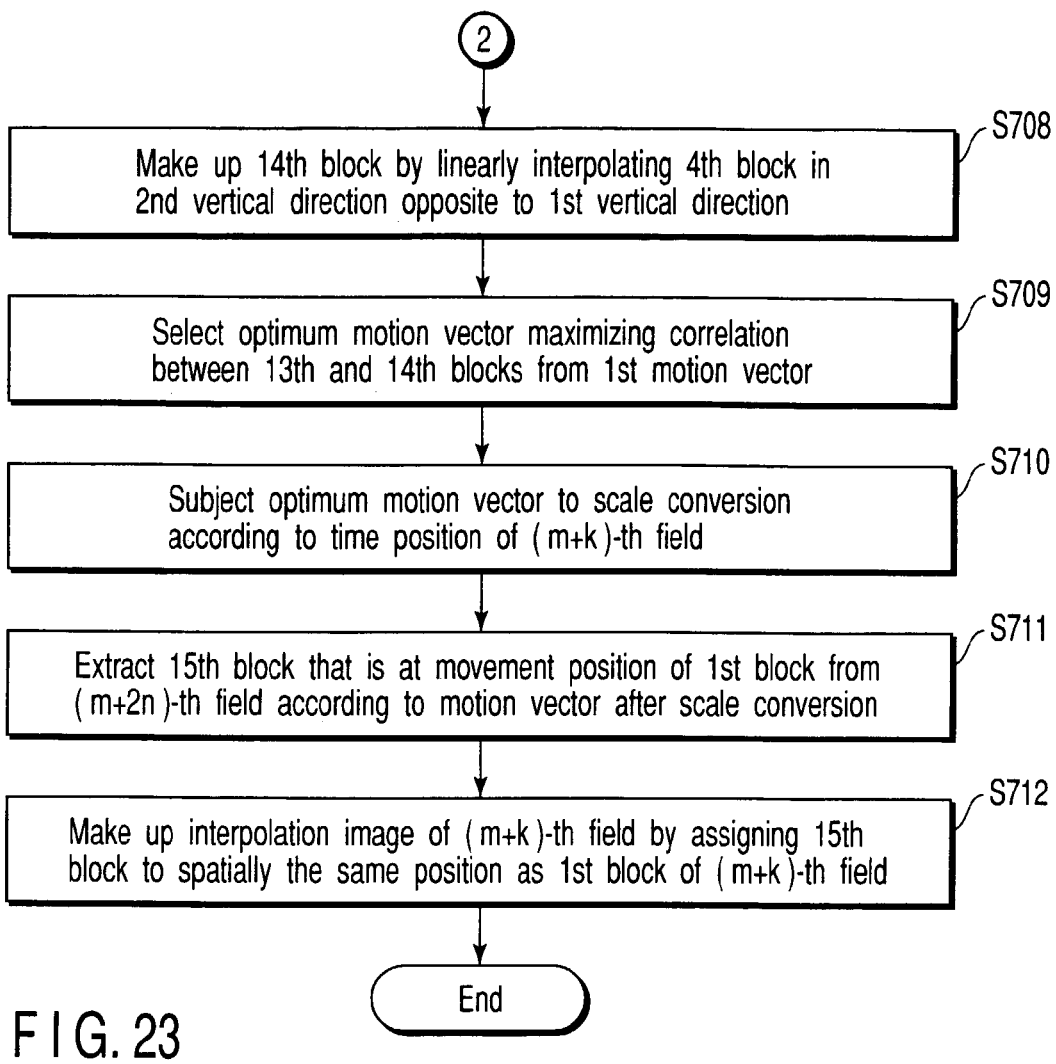
FIG. 23 is a flowchart that shows a motion vector detection procedure related to the embodiment.

A method of detecting a motion vector and forming an interpolation image when an original picture is an interlaced picture will be described referring to FIGS. 21-23.

At first the first block 11 is extracted from the motion vector search area of the m-th field 1 (step S701). A plurality of second blocks 12 having a large correlation with respect to the first block are extracted from a plurality of blocks of the same block size as the first block 11 in the motion vector search area of the (m+2n)-th field (n is an integer more than 1) (step S702). The first vector connecting between the first block 11 and the second block 12 is detected as the motion vector D (step S703).

The third block (interlaced block) 13 at a spatial position shifted spatially by ½ line in a vertical direction (upper or lower direction) from the first block 11 of the m-th frame 1 is extracted from a (m+2n−1)-th field (step S704). A second motion vector D/2 whose direction is the same as that of the first motion vector D and whose quantity of movement is ½ that of the first motion vector D (step S705) is computed. The fourth block (interlaced block) 14 at a movement position of a block that is located in spatially the same position as that of the first block 11 and moves to the (m+2n)-th field is extracted from the (m+2n)-th field according to the second motion vector D/2 (step S706).

A thirteenth block 23 is formed by subjecting the third block 13 to linear interpolation in the first vertical direction (e.g., upper direction) (step S707). Furthermore, a 14th block 24 is formed by subjecting the fourth block 14 to linear interpolation in the second vertical direction (lower direction) opposite to the first vertical direction (step S708). Propriety of the first motion vector 11 is determined using the 13th block 23 and the 14th block 24. In other words, a correlation between, for example, the 13th block 23 and the 14th block 24 is inspected by computing an absolute value difference sum, and the first motion vector D that maximizes the correlation is selected as an optimum motion vector (step S709).

An interpolation image of the (m+k)-th field is formed using basically the same method as the sixth embodiment. In other words, similar to steps S602-S604 in FIG. 20 in the sixth embodiment, the third motion vector is obtained by scale-converting the optimum motion vector pursued with step S709 according to a time position of the (m+k)-th field (step S710). The 15th block corresponding to a movement position of the first block 11 from the (m+2n)-th field is extracted from the (m+2n)-th field according to the third motion vector after scale conversion (step S711). The interpolation image of the (m+k)-th field is formed by assigning the 15th block to spatially the same position as the first block 11 of the (m+k)-th field (step S712). The 15th block is an image on the frame (m+n)-th frame. However, when no image exists at the position indicated by the motion vector, that is, an image exists between lines, an image is formed using upper and lower lines. The 15th block is formed by subjecting the upper and lower lines to, for example, a linear interpolation.

In k=0.5, for example, when an interpolation image of (m+1.5)-th field is formed, the fifth block corresponding to a movement position to the (m+2n)-th field is extracted from the (m+2n)-th field according to the third motion vector whose direction is the same as the optimum motion vector and whose quantity of movement is ¼ of the first motion vector. The fifth block is assigned to the (m+1.5)-th Field. Similarly, the interpolation image is completed by acquiring the fifth blocks on (m+1.5)-th field and assigning them to the (m+1.5)-th field. This method acquires a progressive image as a field image basically. When the field of interpolation image is subjected to an interlacing process, the field must be vertically skipped with respect to lines.

THE EIGHTH EMBODIMENT

There will now be described an image display system using the motion vector detection method and the interpolation image forming method of the above embodiments as the eighth embodiment of the present invention.

Figure 24:
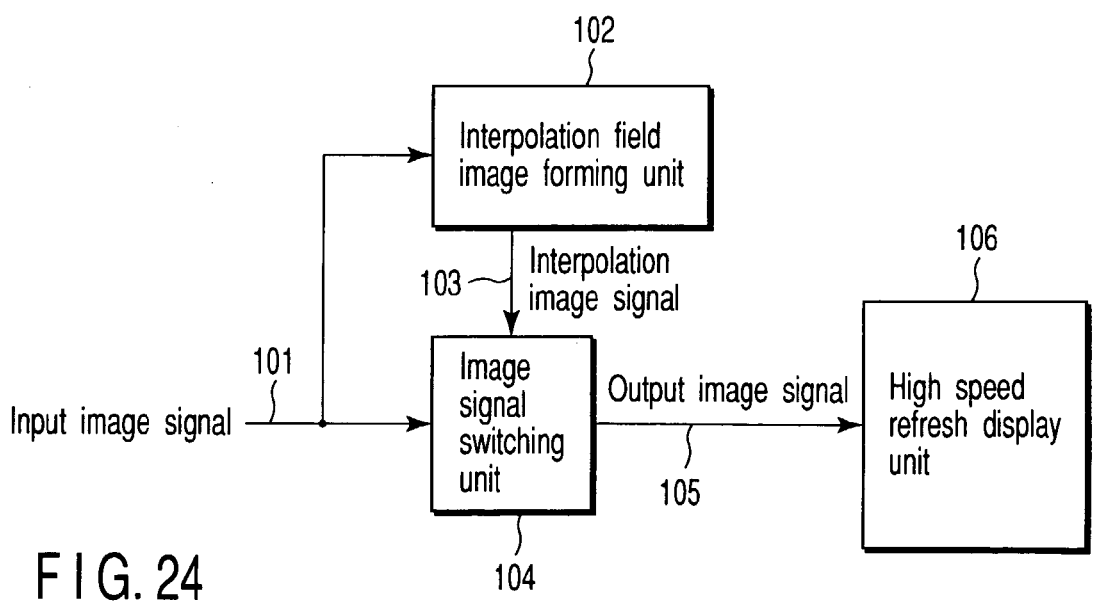
FIG. 24 is a block diagram of a display system related to an embodiment of the present invention.

FIG. 24 shows a schematic configuration of an image display system. An input image signal 101 is input to an interpolation field image forming unit 102 and an image switching unit 104. The interpolation field image forming unit 102 forms an interpolation image signal according to the procedure described above. The interpolation image signal 103 is output to the image switching unit 104. The image switching unit 104 switches from the input image signal 101 to the interpolation video signal 104 or vice versa. The output video signal 105 from the image switching unit 104 is output to a high-speed refresh display 106 that is a hold type display. The display 106 changes a refresh rate according to a synchronizing signal included in the output video signal 105, and displays an image.

As described above, according to the present invention, the error motion vector different from actual movement of the image is removed and the precision motion vector can be detected. Further, an output image signal of high frame frequency can be formed from an input image signal of low frame frequency by forming an interpolation image using the precision motion vector. A moving image that is more real and a still picture of a little picture quality degradation can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A motion vector detection method of detecting a motion vector between a m-th frame (m is an integer) and a (m+n)-th frame (n is an integer not less than i+1 and i is an integer not less than 1), the method comprising:

extracting a first block from a motion vector search area of the m-th frame;

extracting a plurality of second blocks in order of decreasing correlation with respect to the first block from a motion vector search area of the (m+n)-th frame;

detecting a plurality of first motion vectors between the first block and the plurality of second blocks;

extracting, from a (m+i)-th frame, a third block that is located in spatially the same position as that of the first block;

computing a plurality of second motion vectors that are (n−1)/n times the first motion vectors;

extracting, from the (m+n)-th frame, a plurality of fourth blocks corresponding to movement positions of the third block according to the second motion vectors;

selecting, from the plurality of first motion vectors, an optimum motion vector corresponding to a maximum correlation of correlations among the third block and the fourth blocks; and outputting the selected optimum motion vector to generate an interpolation image.

2. The method according to claim 1, wherein selecting the optimum motion vector includes comparing the third block with the fourth block corresponding to each of the second motion vectors to inspect the correlation therebetween.

3. An interpolation image forming method of forming an interpolation image at a time position of a (m+k)-th frame (k is an actual number) between a m-th frame (m is an integer) and a (m+n)-th frame (n is an integer not less than i+1 and i is an integer not less than 1), the method comprising:

inputting the optimum motion vector obtained by the motion vector detection method of claim 1;

scale-converting the optimum motion vector according to the time position of the (m+k)-th frame;

extracting, from the (m+i)-th frame, a fifth block corresponding to a movement position of the first block according to the scale-converted optimum motion vector; and forming an interpolation image by assigning the fifth block to spatially the same position of the (m+k)-th frame as that of the first block.

4. The method according to claim 1, which further includes:
computing a plurality of third motion vectors which are i/n times the first motion vectors;
extracting, from the (m+i)-th frame, a plurality of fifth blocks corresponding to movement positions of the first block according to the third motion vectors, and wherein the selecting the optimum motion vector includes:
selecting several ones of the first motion vectors in order of decreasing correlation of correlations among the first block and the second blocks and correlations among the first block and the fifth blocks; and
selecting, from selected several ones of the first motion vectors, an optimum motion vector corresponding to a maximum correlation of correlations among the third block and the fourth blocks.

5. The method according to claim 1, which further includes:
extracting, from the (m+n)-th frame, a sixth block that is located in spatially the same position as that of the first block;
extracting, from a motion vector search area of the m-th frame, a plurality of seventh blocks in order of decreasing correlation with respect to the sixth block;
detecting a plurality of fourth motion vectors between the sixth block and the seventh blocks;
computing a plurality of fifth motion vectors which are i/n times the fourth motion vectors;
extracting, from the m-th frame, a plurality of eighth blocks corresponding to movement positions of the third block according to the fifth motion vectors, and wherein the selecting the optimum motion vector includes:
selecting, from the plurality of first motion vectors, as an optimum first motion vector one motion vector corresponding to a maximum correlation of correlations among the third block and the fourth blocks;
selecting, from the plurality of fourth motion vectors, as an optimum third motion vector one motion vector corresponding to a maximum correlation of correlations among the third block and the eighth blocks;
comparing a first absolute value difference sum on pixel values of the third block and the fourth block with a second absolute value difference sum on pixel values of the third block and the eighth blocks;
selecting the optimum first motion vector as the optimum motion vector when the first absolute value difference sum is smaller than the second absolute value difference sum; and
selecting an inverse vector of the optimum third motion vector as the optimum motion vector when the second absolute value difference sum is smaller than the first absolute value difference sum.

6. An interpolation image forming method of forming an interpolation image at a time position of a (m+k)-th frame (k is an actual number) between a m-th frame (m is an integer) and a (m+n)-th frame (n is an integer not less than i+1 and i an integer not less than 1) of an Withdrawn image, the method comprising:
inputting the optimum motion vector obtained by the motion vector detection method of claim 1;
scale-converting the optimum motion vector according to the time position of the (m+k)-th frame;
extracting, from the (m+i)-th frame, a twelfth block corresponding to a movement position of an interpolation block located at spatially the same position as the first block in the (m+k)-th frame according to the scale-converted motion vector; and
forming an interpolation image by assigning the twelfth block to the interpolation block located at spatially the same position as the first block in the (m+k)-th frame.

7. An image display system of displaying the interpolation image formed by the interpolation image forming method of claim 6 and the Withdrawn image.

8. A motion vector detection apparatus of detecting a motion vector between a m-th frame (m is an integer) and a (m+n)-th frame (n is an integer not less than i+1 and i is an integer not less than 1), the apparatus comprising:
a first extraction unit configured to extract a first block from a motion vector search area of the m-th frame;
a second extraction unit configured to extract a plurality of second blocks in order of decreasing correlation with respect to the first block from a motion vector search area of the (m+n)-th frame;
a detection unit configured to detect a plurality of first motion vectors between the first block and the plurality of second blocks;
a third extraction unit configured to extract, from a (m+i)-th frame, a third block that is located in spatially the same position as that of the first block;
a computation unit configured to compute a plurality of second motion vectors that are (n−i)/n times the first motion vectors;
a fourth extraction unit configured to extract, from the (m+n)-th frame, a plurality of fourth blocks corresponding to movement positions of the third block according to the second motion vectors;
a selection unit configured to select, from the plurality of first motion vectors, an optimum motion vector corresponding to a maximum correlation of correlations among the third block and the fourth blocks; and
an output unit configured to output the selected optimum motion vector to generate an interpolation image.

9. The apparatus according to claim 8, wherein the selection unit configured to select the optimum motion vector includes comparing the third block with the fourth block corresponding to each of the second motion vectors to inspect the correlation therebetween.

10. An interpolation image forming apparatus of forming an interpolation image at a time position of a (m+k)-th frame (k is an actual number) between a m-th frame (m is an integer) and a (m+n)-th frame (n is an integer not less than i+1 and i is an integer not less than 1), the apparatus comprising:
an input unit configured to input the optimum motion vector obtained by the motion vector detection apparatus of claim 8;
a scale-conversion unit configured to perform scale-conversion on the optimum motion vector according to the time position of the (m+k)-th frame;
an extraction unit configured to extract, from the (m+i)-th frame, a fifth block corresponding to a movement position of the first block according to the scale-converted optimum motion vector; and
an image forming unit configured to form an interpolation image by assigning the fifth block to spatially the same position of the (m+k)-th frame as that of the first block.

11. The apparatus according to claim 8, which further includes:

a computation unit configured to compute a plurality of third motion vectors which are i/n times the first motion vectors; and a fifth extraction unit configured to extract, from the (m+i)-th frame, a plurality of fifth blocks corresponding to movement positions of the first block according to the third motion vectors, and wherein the selection unit has:

a function of selecting several ones of the first motion vectors in order of decreasing correlation of correlations among the first block and the second blocks and correlations among the first block and the fifth blocks; and a function of selecting, from selected several ones of the first motion vectors, an optimum motion vector corresponding to a maximum correlation of correlations among the third block and the fourth blocks.

12. The apparatus according to claim 8, which further includes:

a sixth extraction unit configured to extract, from the (m+n)-th frame, a sixth block that is located in spatially the same position as that of the first block;

a seventh extraction unit configured to extract, from a motion vector search area of the m-th frame, a plurality of seventh blocks in order of decreasing correlation with respect to the sixth block;

a detection unit configured to detect a plurality of fourth motion vectors between the sixth block and the seventh blocks;

a computation unit configured to compute a plurality of fifth motion vectors which are i/n times the fourth motion vectors;

an eighth extraction unit configured to extract, from the m-th frame, a plurality of eighth blocks corresponding to movement positions of the third block according to the fifth motion vectors, and wherein the selecting the optimum motion vector includes:

a selection unit configured to select, from the plurality of first motion vectors, as an optimum first motion vector one motion vector corresponding to a maximum correlation of correlations among the third block and the fourth blocks;

a selection unit configured to select, from the plurality of fourth motion vectors, as an optimum third motion vector one motion vector corresponding to a maximum correlation of correlations among the third block and the eighth blocks;

a comparison unit configured to compare a first absolute value difference sum on pixel values of the third block and the fourth block with a second absolute value difference sum on pixel values of the third block and the eighth blocks;

a selection unit configured to select the optimum first motion vector as the optimum motion vector when the first absolute value difference sum is smaller than the second absolute value difference sum; and a selection unit configured to select an inverse vector of the optimum third motion vector as the optimum motion vector when the second absolute value difference sum is smaller than the first absolute value difference sum.

13. An interpolation image forming apparatus of forming an interpolation image at a time position of a (m+k)-th frame (k is an actual number) between a m-th frame (m is an integer) and a (m+n)-th frame (n is an integer not less than i+1 and i an integer not less than 1) of an Withdrawn image, the apparatus comprising:

an input unit configured to input the optimum motion vector obtained by the motion vector detection apparatus of claim 8;

a scale-conversion unit configured to perform scale-conversion on the optimum motion vector according to the time position of the (m+k)-th frame;

an extraction unit configured to extract, from the (m+i)-th frame, a twelfth block corresponding to a movement position of an interpolation block located at spatially the same position as the first block in the (m+k)-th frame according to the scale-converted motion vector; and an interpolation image forming unit configured to form an interpolation image by assigning the twelfth block to the interpolation block located at spatially the same position as the first block in the (m+k)-th frame.

* * * * *